US00RE44489E

(19) United States
(12) Reissued Patent
Yamaguchi et al.

(10) Patent Number: US RE44,489 E
(45) Date of Reissued Patent: Sep. 10, 2013

(54) ELECTROLYTIC SOLUTION AND BATTERY

(75) Inventors: Akira Yamaguchi, Fukushima (JP); Tadahiko Kubota, Kanagawa (JP); Atsumichi Kawashima, Fukushima (JP); Akinori Kita, Fukushima (JP); Satoshi Mizutani, Fukushima (JP); Hiroshi Inoue, Fukushima (JP)

(73) Assignee: Sony Corporation, Tokoy (JP)

(21) Appl. No.: 13/475,199

(22) Filed: May 18, 2012

Related U.S. Patent Documents

Reissue of:
(64) Patent No.: 7,718,311
Issued: May 18, 2010
Appl. No.: 11/267,116
Filed: Nov. 3, 2005

(30) Foreign Application Priority Data

Nov. 5, 2004 (JP) ..... P2004-322665

(51) Int. Cl.
*H01M 6/04* (2006.01)
*H01M 6/16* (2006.01)

(52) U.S. Cl.
USPC ..... 429/188; 429/324; 429/336; 429/337; 429/338

(58) Field of Classification Search
USPC ..... 429/188, 324, 336, 337, 338
See application file for complete search history.

(56) References Cited

U.S. PATENT DOCUMENTS 4,432,841 A * 2/1984 Badesha et al. ..... 205/557
4,950,566 A * 8/1990 Huggins et al. ..... 429/231.6
5,395,711 A * 3/1995 Tahara et al. ..... 429/332
5,506,075 A * 4/1996 Iwasaki et al. ..... 429/342
5,750,730 A * 5/1998 Nakano et al. ..... 549/229
6,045,945 A * 4/2000 Hamamoto et al. ..... 429/200
6,506,524 B1 * 1/2003 McMillan et al. ..... 429/324

FOREIGN PATENT DOCUMENTS

| | | | |
|---|---|---|---|
| JP | 62-290070 | * | 12/1987 |
| JP | 07-230800 | * | 8/1994 |
| JP | 06-325765 | * | 11/1994 |
| JP | 07-085888 | * | 3/1995 |
| JP | 07-230800 | | 8/1995 |
| JP | 07-240232 | * | 9/1995 |
| JP | 07-288130 | * | 10/1995 |
| JP | 11-132152 | * | 5/1999 |
| JP | 2000-012023 | * | 1/2000 |
| JP | 2000-223368 | * | 8/2000 |
| JP | 2001-501355 | | 1/2001 |
| JP | 2001-093572 | * | 4/2001 |
| JP | 2001-196073 | * | 7/2001 |
| JP | 2002-231307 | | 8/2002 |

(Continued)

OTHER PUBLICATIONS

English Translated Japanese Abstract of JP 62-290072, Yoshinori et al., Jun. 1987, Abstract.*

*Primary Examiner* — Helen O Conley
(74) *Attorney, Agent, or Firm* — K&L Gates LLP

(57) ABSTRACT

A battery capable of improving battery characteristics such as cycle characteristics is provided. An electrolytic solution is impregnated in a separator. The electrolytic solution contains 4-fluoro-1,3-dioxolane-2-one. Fluorine ion content in the electrolytic solution is preferably from 10 weight ppm to 3200 weight ppm. Thereby, chemical stability of the electrolytic solution is improved, and cycle characteristics are improved. The present invention is effective for the case using an anode active material containing Sn or Si as an element for an anode.

39 Claims, 11 Drawing Sheets

(56) References Cited

FOREIGN PATENT DOCUMENTS

| | | | | |
|---|---|---|---|---|
| JP | 2002-324577 | 11/2002 | | |
| JP | 2002-324577 | | * | 2/2004 |
| JP | 2004-063432 | | * | 2/2004 |
| JP | 2004-241339 | | * | 8/2004 |

* cited by examiner

ELECTROLYTIC SOLUTION AND BATTERY

Matter enclosed in heavy brackets [ ] appears in the original patent but forms no part of this reissue specification; matter printed in italics indicates the additions made by reissue.

CROSS REFERENCES TO RELATED APPLICATIONS

The present invention claims priority to Japanese Patent Application JP 2004-322665 filed in the Japanese Patent Office on Nov. 5, 2004, the entire contents of which being incorporated herein by reference.

BACKGROUND

The present invention relates to an electrolytic solution and a battery using it, and more particularly to an electrolytic solution effective for the case using an anode active material containing at least one of tin (Sn) and silicon (Si) as an element and a battery using it.

As electronic devices have been downsized, development of batteries having a high energy density has been demanded. As a battery meeting such a demand, there is a lithium metal secondary battery utilizing precipitation and dissolution reaction of lithium (Li). However, since in the lithium metal secondary battery, lithium is dendrite-precipitated on the anode and inactivated upon charging, there is a disadvantage that the cycle life thereof is short.

As a battery with the improved cycle life, lithium ion secondary batteries have been commercialized. For the anode of the lithium ion secondary batteries, an anode active material such as a graphite material utilizing intercalation reaction of lithium to the graphite intercalations and a carbonaceous material applying lithium insertion and extraction action to and from the fine pores is used. Therefore, in the lithium ion secondary battery, lithium is not dendrite-precipitated and the cycle life is long. Further, since the graphite material or the carbonaceous material is stable in the air, large merit can be obtained in view of industrial production.

However, for the anode capacity by intercalation, there is the upper limit as defined by composition, $C_6Li$ of the first stage graphite intercalation compound. Further, controlling fine pore structure of the carbonaceous material is industrially difficult, and results in decreased specific gravity of the carbonaceous material, and therefore does not act as an effective means for improving anode capacity per unit volume, furthermore improving battery capacity per unit volume. It is known that certain low-temperature fired carbonaceous materials show the anode discharge capacity beyond 1000 mAh/g. However, since such materials have a large capacity at a noble potential of 0.8 V or more in the counter lithium metal, there is a shortcoming that the discharge voltage is decreased when the battery is formed by using a metal oxide or the like for the cathode.

From the foregoing reasons, it is difficult to address the progressive tendency of long time usage of electronic devices and high energy density of the power source with the current carbonaceous materials, and anode active materials with larger lithium insertion and extraction ability is aspired.

Meanwhile, as an anode active material capable of attaining higher capacity, materials obtained by applying the fact that certain lithium alloys are electrochemically and reversibly generated and decomposed have been widely researched. For example, lithium-aluminum alloy has been widely researched, and silicon alloy has been reported in U.S. Pat. No. 4,950,566. However, there is a disadvantage that when such alloys are used for anodes of batteries, cycle characteristics are deteriorated. One of the causes is that such alloys are expanded and shrunk associated with charge and discharge, and pulverized as charge and discharge are repeated.

Therefore, in order to inhibit pulverization of such alloys, for example, it has been considered that substitution is partly made with an element not involved in expansion and shrinkage associated with insertion and extraction of lithium. For example, $LiSi_aO_b$ ($0 \leqq a$, $0<b<2$) (refer to Japanese Unexamined Patent Application Publication No. H06-325765), $Li_cSi_{1-d}M_dO_e$ (M represents a metal element except for alkali metals or a metalloid element except for silicon, $0 \leqq c$, $0<d<1$, and $0<e<2$) (refer to Japanese Unexamined Patent Application Publication No. H07-230800), lithium-silver-tellurium alloy (refer to Japanese Unexamined Patent Application Publication No. H07-288130), and the like have been suggested. Further, a compound containing one or more nonmetallic elements and a metal element or a metalloid element of Group 14 in the long period periodic table (refer to Japanese Unexamined Patent Application Publication No. H11-102705) has been suggested.

However, even in the case using such anode active materials, there is a disadvantage that deterioration of cycle characteristics due to expansion and shrinkage is large, and therefore the batteries with such anode active materials are not sufficient for being used for the mobile devices attaching importance to cycle characteristics.

SUMMARY

In view of the foregoing, in the present invention, it is desirable to provide a battery capable of improving battery characteristics such as cycle characteristics According to an embodiment of the present invention, there is provided an electrolytic solution containing 4-fluoro-1,3-dioxolane-2-one, in which fluorine ion content is in the range from 14 weight ppm to 1290 weight ppm.

According to an embodiment of the present invention, there is provided a battery including a cathode, an anode, and an electrolytic solution, in which the electrolytic solution contains 4-fluoro-1,3-dioxolane-2-one, and fluorine ion content in the electrolytic solution is in the range from 14 weight ppm to 1290 weight ppm.

According to the electrolytic solution of the embodiment of the present invention, the fluorine ion content is from 14 weight ppm to 1290 weight ppm, and therefore chemical stability can be improved. Therefore, for example, when the electrolytic solution is used for a battery, battery characteristics such as cycle characteristics can be improved. In particular, in the case using an anode active material containing at least one of tin and silicon as an element, higher effects can be obtained. Further, when the cathode contains a complex oxide containing lithium and nickel (Ni), cycle characteristics can be more improved.

Additional features and advantages are described herein, and will be apparent from, the following Detailed Description and the figures.

DETAILED DESCRIPTION

Figure 1:
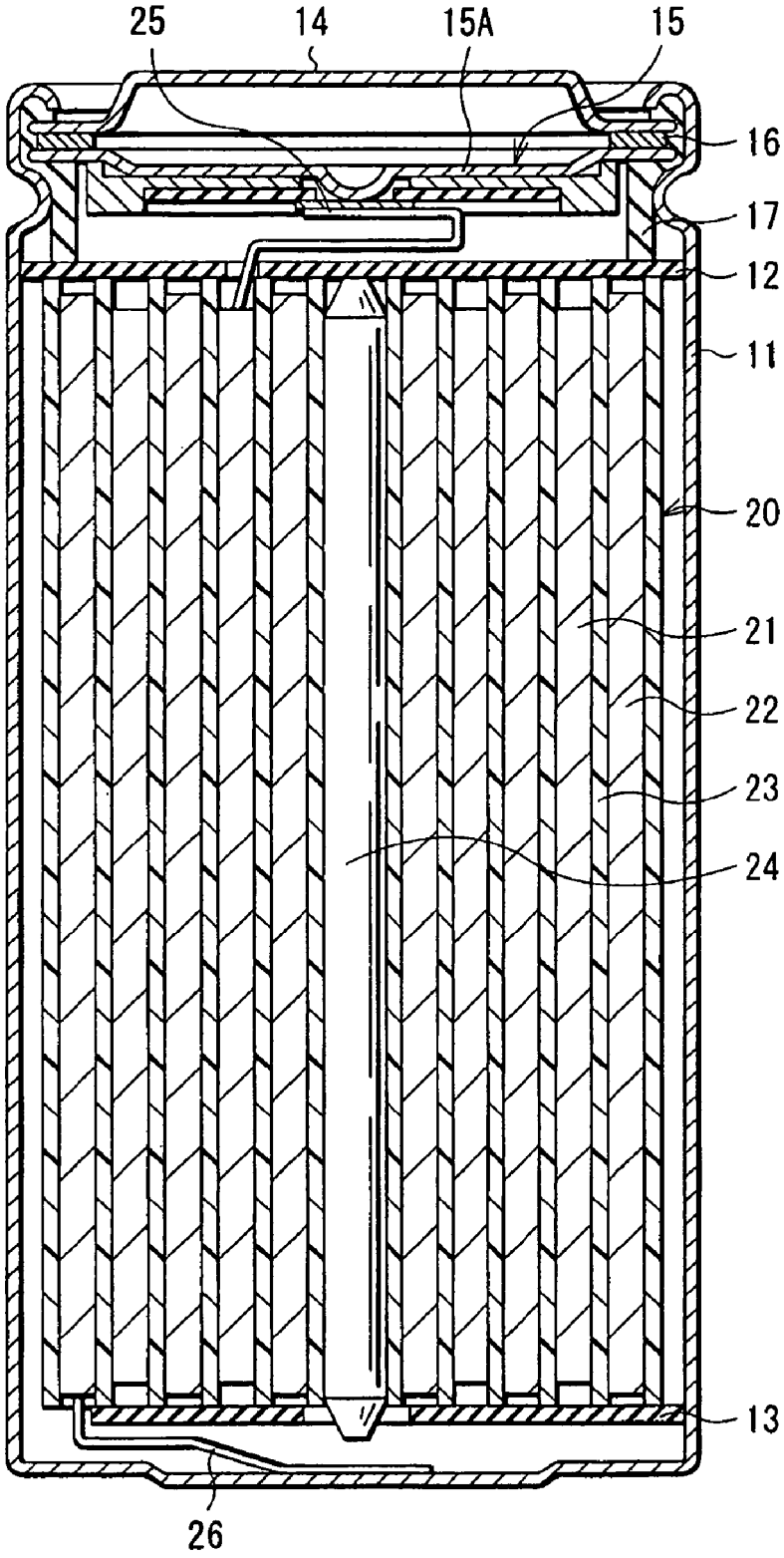
FIG. 1 is a cross section showing a structure of a first secondary battery using an electrolytic solution according to an embodiment of the present invention.

Various embodiments of the present invention will be hereinafter described in detail with reference to the drawings.

An electrolytic solution according to an embodiment of the present invention contains, for example, a solvent and an electrolyte salt dissolved in the solvent.

The solvent contains 4-fluoro-1,3-dioxolane-2-one expressed in Chemical formula 1 as shown below, which has high reduction resistance and is hardly decomposed. The solvent may include 4-fluoro-1,3-dioxolane-2-one only, or may include mixture of 4-fluoro-1,3-dioxolane-2-one and other one or more solvents, which results in improving various characteristics such as ion conductivity.

Chemical formula 1

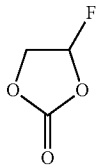

As other solvent, for example, a nonaqueous solvent such as ethylene carbonate, propylene carbonate, dimethyl carbonate, diethyl carbonate, methyl ethyl carbonate, 1,2-dimethoxy ethane, 1,2-diethoxy ethane, γ-butyrolactone, γ-valerolactone, tetrahydrofuran, 2-methyl tetrahydrofuran, 1,3-dioxolane, 4-methyl-1,3-dioxolane, 1,3-dioxole-2-one, 4-vinyl-1,3-dioxolane-2-one, diethyl ether, sulfolane, methyl sulfolane, anisole, ester acetate, ester butyrate, ester propionate, fluoro benzene, and ethylene sulfite can be cited.

In a preferred embodiment, the low viscosity solvents having a viscosity of 1 mPa·s or less such as dimethyl carbonate, diethyl carbonate, and methyl ethyl carbonate are preferably mixed, since higher ion conductivity can be thereby obtained.

Further, nitrile such as acetonitrile ($CH_3CN$) and propionitrile ($CH_3CH_2CN$) may be mixed in the solvent, since battery characteristics such as cycle characteristics under high temperatures and capacity retention ratio after being stored at high temperatures can be thereby improved. The nitrile content in the electrolytic solution is preferably from 0.1 wt % to 3 wt %, and more preferably from 0.1 wt % to 2 wt % in order to obtain higher effects.

As an electrolyte salt, for example, a lithium salt such as $LiPF_6$, $LiBF_4$, $LiClO_4$, $LiAsF_6$, $LiN(CF_3SO_2)_2$, $LiN(C_2F_5SO_2)_2$, $LiC(CF_3SO_2)_3$, $LiB(C_6H_5)_4$, $LiB(C_2O_4)_2$, $LiCF_3SO_3$, $LiCH_3SO_3$, LiCl, and LiBr can be cited. The electrolyte salt may be used singly, or two or more thereof may be used by mixing.

The electrolytic solution contains a small amount of fluorine ions ($F^-$). In many cases, 4-fluoro-1,3-dioxolane-2-one contains a small amount of fluorine ions as impurity. Otherwise, fluorine ions may be generated by decomposition of the solvent or the electrolyte salt. However, the fluorine ion content in the electrolytic solution is preferably in the range from 14 weight ppm to 1290 weight ppm, more preferably in the range from 14 weight ppm to 570 weight ppm, much more preferably in the range from 30 weight ppm to 570 weight ppm, and still much more preferably in the range from 50 weight ppm to 570 weight ppm. Further, the amount of fluorine ions contained in 4-fluoro-1,3-dioxolane-2-one as impurity is preferably in the range from 10 weight ppm to 3200 weight ppm, more preferably in the range from 10 weight ppm to 1400 weight ppm, much more preferably in the range from 50 weight ppm to 1400 weight ppm, and still much more preferably in the range from 100 weight ppm to 1400 weight ppm.

When the fluorine ion content is too large, chemical stability is decreased, which causes lowered various characteristics. When the fluorine ion content is equal to or less than a certain degree, sufficient characteristics can be obtained. On the contrary, when the fluorine ion content is too small, characteristics may be lowered. Further, in order to decrease the fluorine ion content, 4-fluoro-1,3-dioxolane-2-one should be refined to the high purity level, which results in complicated manufacturing process. The reason that the characteristics are lowered when the fluorine ion content is small is as follows. That is, it is thinkable that when fluorine ions are contained in the electrolytic solution, a coat of lithium fluoride or the like derived from fluorine ions is formed on the anode, and decomposition reaction of the electrolytic solution in the anode can be inhibited.

The electrolytic solution is used for a secondary battery as follows, for example.

(First Secondary Battery)

FIG. 1 shows a cross sectional structure of a first secondary battery using the electrolytic solution according to this embodiment. The secondary battery is a so-called lithium ion secondary battery in which the anode capacity is expressed by the capacity component by insertion and extraction of lithium as the electrode reactant. The secondary battery is a so-called cylindrical battery, and has a spirally wound electrode body 20 in which a strip-shaped cathode 21 and a strip-shaped anode 22 are layered with a separator 23 inbetween and wound inside a battery can 11 in the shape of an approximately hollow cylinder. The battery can 11 is made of, for example, iron (Fe) plated by nickel. One end of the battery can 11 is closed, and the other end thereof is opened. Inside the battery can 11, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is thereby sealed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation by a large current. The gasket 17 is made of, for example, an insulating material and its surface is coated with asphalt.

For example, a center pin 24 is inserted in the center of the spirally wound electrode body 20. A cathode lead 25 made of aluminum (Al) or the like is connected to the cathode 21 of the spirally wound electrode body 20. An anode lead 26 made of nickel (Ni) or the like is connected to the anode 22. The cathode lead 25 is electrically connected to the battery cover 14 by being welded to the safety valve mechanism 15. The anode lead 26 is welded and electrically connected to the battery can 11.

Figure 2:
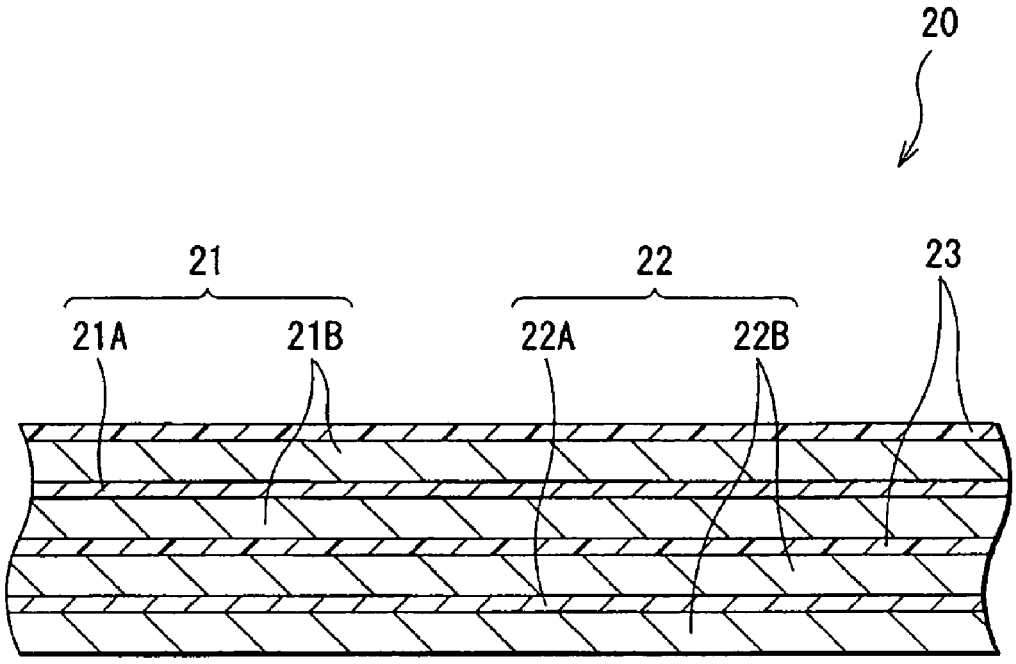
FIG. 2 is a cross section showing an enlarged part of a spirally wound electrode body in the secondary battery shown in FIG. 1.

FIG. 2 shows an enlarged part of the spirally wound electrode body 20 shown in FIG. 1. The cathode 21 has a structure in which, for example, a cathode active material layer 21B is provided on both faces or a single face of a cathode current collector 21A having a pair of opposed faces. The cathode current collector 21A is made of, for example, a metal foil such as an aluminum foil, a nickel foil, and a stainless foil.

The cathode active material layer 21B contains, for example, one or more cathode materials capable of inserting and extracting lithium as a cathode active material. If necessary, the cathode active material layer 21B may also contain a conductive material such as a carbon material and a binder such as polyvinylidene fluoride. As a cathode material capable of inserting and extracting lithium, for example, a metal sulfide, a metal selenide, or a metal oxide containing no lithium, such as titanium sulfide ($TiS_2$), molybdenum sulfide ($MoS_2$), niobium selenide ($NbSe_2$), and vanadium oxide ($V_2O_5$), or a lithium containing compound containing lithium can be cited.

In particular, the lithium containing compound is preferable since some lithium containing compounds can provide a high voltage and a high energy density. As such a lithium containing compound, for example, a complex oxide containing lithium and transition metal elements, or a phosphate compound containing lithium and transition metal elements can be cited. In particular, a compound containing at least one of cobalt (Co), nickel, and manganese (Mn) is preferable, since such a compound can provide a higher voltage. The chemical formula thereof can be expressed by, for example, $Li_xMIO_2$ or $Li_yMIIPO_4$. In the formula, MI and MII represent one or more transition metal elements. Values of x and y vary according to charge and discharge states of the battery, and the values of x and y are generally in the range of $0.05 \leqq x \leqq 1.10$ and $0.05 \leqq y \leqq 1.10$.

As a specific example of the complex oxide containing lithium and transition metal elements, a lithium cobalt complex oxide ($LixCoO_2$), a lithium nickel complex oxide ($Li_xNiO_2$), a lithium nickel cobalt complex oxide ($Li_xNi_{1-z}Co_zO_2$ ($z<1$)), lithium manganese complex oxide having a spinel type structure ($LiMn_2O_4$) or the like can be cited. Specially, the complex oxide containing nickel is preferable, since such a complex oxide containing nickel can provide a high capacity and superior cycle characteristics. As a specific example of the phosphate compound containing lithium and transition metal elements, for example, lithium iron phosphate compound ($LiFePO_4$) or a lithium iron manganese phosphate compound ($LiFe_{1-v}Mn_vPO_4$ ($v<1$)) can be cited.

The anode 22 has a structure in which, for example, an anode active material layer 22B is provided on both faces or a single face of an anode current collector 22A having a pair of opposed faces. The anode current collector 22A is made of, for example, a metal foil such as a copper (Cu) foil, a nickel foil, and a stainless foil.

The anode active material layer 22B contains, for example, one or more anode active materials capable of inserting and extracting lithium as an anode active material. As an anode material capable of inserting and extracting lithium, for example, a material containing tin or silicon as an element can be cited. Tin and silicon have a high ability to insert and extract lithium and provide a high energy density.

As such an anode material, specifically, a simple substance, an alloy, or a compound of tin; a simple substance, an alloy, or a compound of silicon; or a material having one or more phases thereof at least in part can be cited. In the present invention, alloys also include an alloy containing one or more metal elements and one or more metalloid elements, in addition to an alloy including two or more metal elements. Further, an alloy may contain nonmetallic elements. The structure thereof may be a solid solution, an eutectic crystal (eutectic mixture), an intermetallic compound, or a structure in which two or more of the foregoing structures coexist.

As an alloy of tin, for example, an alloy containing at least one from the group consisting of silicon, nickel, copper, iron (Fe), cobalt, manganese, zinc (Zn), indium (In), silver (Ag), titanium (Ti), germanium (Ge), bismuth (Bi), antimony (Sb), and chromium (Cr) as a second element other than tin can be cited. As an alloy of silicon, for example, an alloy containing at least one from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

Specially, as such an anode material, a CoSnC containing material containing tin, cobalt, and carbon as an element, in which the carbon content is from 9.9 wt % to 29.7 wt %, and the ratio of cobalt to the total of tin and cobalt is from 30 wt % to 70 wt % is preferable. In such a composition range, a high energy density can be obtained, and superior cycle characteristics can be obtained.

The CoSnC containing material may further contain other elements if necessary. As other element, for example, silicon, iron, nickel, chromium, indium, niobium (Nb), germanium, titanium, molybdenum (Mo), aluminum, phosphorus (P), gallium (Ga), or bismuth is preferable. Two or more thereof may be contained, since a capacity or cycle characteristics can be thereby further improved.

The CoSnC containing material has a phase containing tin, cobalt, and carbon. The phase preferably has a structure with low crystallinity or an amorphous structure. Further, it is preferable that in the CoSnC containing material, at least part of carbon as the element is bonded with a metal element or a metalloid element as other element. The reason thereof is as follows. It is thinkable that lowered cycle characteristics are caused by cohesion of tin or the like. Such cohesion or crystallization can be inhibited by bonding carbon with other element.

As a measuring method for examining bonding state of elements, for example, X-ray Photoelectron Spectroscopy (XPS) can be cited. In XPS, in the case of graphite, the peak of 1s orbital of carbon (C1s) is shown in 284.5 eV in the apparatus, in which energy calibration is made so that the peak of 4f orbital of gold atom (Au4f) is obtained in 84.0 eV. In the case of surface contamination carbon, the peak is shown in 284.8 eV. Meanwhile, in the case of higher electric charge density of carbon element, for example, when carbon is bonded with a metal element or a metalloid element, the peak of C1s is shown in the region lower than 284.5 eV. That is, when the peak of the composite wave of C1s obtained for the CoSnC containing material is shown in the region lower than 284.5 eV, at least part of carbon contained in the CoSnC containing material is bonded with the metal element or the metalloid element, which are other element.

In XPS measurement, for example, the peak of C1s is used for correcting the energy axis of spectrums. Since surface contamination carbon generally exists on the surface, the peak of C1s of the surface contamination carbon is set to 284.8 eV, which is used as an energy reference value. In XPS measurement, the waveform of the peak of C1s is obtained as a shape including the peak of the surface contamination carbon and the peak of carbon in the CoSnC containing material. Therefore, by analyzing by using a commercially available software or the like, the peak of the surface contamination carbon and the peak of carbon in the CoSnC containing material are separated. In the analysis of the waveform, the position of the main peak existing on the lowest bound energy side is set to the energy reference value (284.8 eV).

As an anode material capable of inserting and extracting lithium, for example, a material containing other metal element or other metalloid element capable of forming an alloy with lithium as an element can be also used. As such a metal element or such a metalloid element, magnesium (Mg), boron (B), aluminum, gallium, indium, germanium, lead (Pb), bismuth, cadmium (Cd), silver, zinc, hafnium (Hf), zirconium (Zr), yttrium (Y), palladium (Pd), or platinum (Pt) can be cited.

As an anode material capable of inserting and extracting lithium, for example, a carbon material such as graphite, non-graphitizable carbon, and graphitizable carbon can be also used. Further, it is possible to use such a carbon material and the foregoing anode material together. Regarding the carbon material, change in crystal structure associated with insertion and extraction of lithium is very small. For example, the carbon material is preferably used with the foregoing anode material, since a high energy density can be obtained, superior cycle characteristics can be obtained, and the carbon material also functions as a electrical conductor.

The anode active material layer 22B may also contain other materials such as a electrical conductor, a binder, and a viscosity modifier, which do not contribute to charge. As a electrical conductor, graphite fiber, metal fiber, metal powders or the like can be cited. As a binder, a fluorinated high molecular weight compound such as polyvinylidene fluoride, or synthetic rubber such as styrene butadiene rubber and ethylene propylene diene rubber can be cited. As a viscosity modifier, carboxymethyl cellulose or the like can be cited.

The separator 23 separates the cathode 21 from the anode 22, prevents current short circuit due to contact of both electrodes, and lets through lithium ions. The separator 23 is made of, for example, a synthetic resin porous film made of polytetrafluoroethylene, polypropylene, polyethylene or the like, or a ceramics porous film. The separator 23 can have a structure, in which two or more of the foregoing porous films are layered.

The electrolytic solution according to this embodiment is impregnated in the separator 23.

The secondary battery can be manufactured, for example, as follows.

First, for example, the cathode active material layer 21B is formed on the cathode current collector 21A to form the cathode 21. The cathode active material layer 21B is formed as follows, for example. A cathode mixture is prepared by mixing, for example, a cathode active material powder, an electrical conductor, and a binder, and then the cathode mixture is dispersed in a solvent such as N-methyl-2-pyrrolidone to obtain a paste cathode mixture slurry. The cathode mixture slurry is applied to the cathode current collector 21A, which is dried and compression-molded. Further, for example, as in the cathode 21, the anode active material layer 22B is formed on the anode current collector 22A to form the anode 22.

Next, the cathode lead 25 is attached to the cathode current collector 21A by welding or the like, and the anode lead 26 is attached to the anode current collector 22A by welding or the like. Subsequently, the cathode 21 and the anode 22 are wound with the separator 23 inbetween. An end of the cathode lead 25 is welded to the safety valve mechanism 15, and an end of the anode lead 26 is welded to the battery can 11. The wound cathode 21 and the wound anode 22 are sandwiched between the pair of insulating plates 12 and 13, and accommodated inside the battery can 11. After the cathode 21 and the anode 22 are accommodated inside the battery can 11, the electrolytic solution is injected into the battery can 11, and impregnated in the separator 23. After that, at the open end of the battery can 11, the battery cover 14, the safety valve mechanism 15, and the PTC device 16 are fixed by being caulked through the gasket 17. The secondary battery shown in FIG. 1 is thereby completed.

In the secondary battery, when charged, for example, lithium ions are extracted from the cathode 21, and are inserted in the anode 22 through the electrolytic solution. When discharged, for example, lithium ions are extracted from the anode 22, and are inserted in the cathode 21 through the electrolytic solution. Then, since the electrolytic solution contains 4-fluoro-1,3-dioxolane-2-one, decomposition reaction of the electrolytic solution is inhibited. Further, since the fluorine ion content in the electrolytic solution is 1290 weight ppm or less, increased internal resistance caused by excessive coat formation on the anode 22 or the like by excessive fluorine ions is inhibited. Further, since the fluorine ion content in the electrolytic solution is 14 weight ppm or more, bare minimum of fluorine ion coat is formed on the anode 22 or the like. Therefore, decomposition reaction of the electrolytic solution is inhibited, chemical stability is improved, and cycle characteristics are improved.

In particular, in the case of using the anode material containing tin or silicon as an element as an anode active material, though activity of the anode 22 is high, decomposition reaction is effectively inhibited by using the foregoing electrolytic solution.

As above, according to this embodiment, the electrolytic solution contains 4-fluoro-1,3-dioxolane-2-one, and the fluorine ion content is in the range from 14 weight ppm to 1290 weight ppm, further in the range from 14 weight ppm to 570 weight ppm. Therefore, chemical stability can be improved, and battery characteristics such as cycle characteristics can be improved.

Further, when the amount of fluorine ions contained in 4-fluoro-1,3-dioxolane-2-one as impurity is in the range from 10 weight ppm to 3200 weight ppm, further in the range from 10 weight ppm to 1400 weight ppm, battery characteristics such as cycle characteristics can be improved.

Further, when the fluorine ion content in the electrolytic solution is 30 weight ppm or more, further 50 weight ppm or more, or when the amount of fluorine ions contained in 4-fluoro-1,3-dioxolane-2-one is 50 weight ppm or more, further 100 weight ppm or more, superior characteristics can be obtained, and refinement steps of 4-fluoro-1,3-dioxolane-2-one can be simplified.

In addition, as an anode active material, in the case of using the anode material containing at least one of tin and silicon as an element, higher effects can be obtained.

Furthermore, when the cathode 21 contains a complex oxide containing lithium and nickel, cycle characteristics can be further improved.

(Second Secondary Battery)

A second secondary battery has a structure and action as in the first secondary battery, except that the structure of the anode is different, and can be manufactured as the first secondary battery. Therefore, with reference to FIGS. 1 and 2, corresponding components are assigned with the same reference symbols and descriptions for the same sections will be omitted.

As in the first secondary battery, the anode 22 has a structure in which the anode active material layer 22B is provided on both faces or a single face of the anode current collector 22A. The anode active material layer 22B contains, for example, an anode active material containing tin or silicon as an element. Specifically, for example, the anode active material layer 22B contains a simple substance, an alloy, or a compound of tin, or a simple substance, an alloy, or a compound of silicon. The anode active material layer 22B may contain two or more thereof.

Further, the anode active material layer 22B is formed by using vapor-phase deposition method, liquid-phase deposition method, thermal spraying method, or firing method, otherwise by using two or more methods thereof. It is preferable that the anode active material layer 22B and the anode current collector 22A are alloyed at least in part of the interface. Specifically, it is preferable that at the interface thereof, the element of the anode current collector 22A is diffused in the anode active material layer 22B, or the element of the anode active material is diffused in the anode current collector 22A, or the both elements are diffused in each other. This is because destruction due to expansion and shrinkage of the anode active material layer 22B associated with charge and discharge can be inhibited, and electron conductivity between the anode active material layer 22B and the anode current collector 22A can be improved. The firing method is a method in which, for example, a particulate anode active material is mixed with a binder or the like, the mixture is diffused in a solvent, the anode current collector is coated with the resultant, and heat treatment is provided at higher temperatures than the melting point of the binder or the like.

(Third Secondary Battery)

A third secondary battery is a so-called lithium metal secondary battery in which the capacity of the anode 22 is expressed by a capacity component by precipitation and dissolution of lithium as the electrode reactant. The secondary battery has a structure as in the first secondary battery, except that the anode active material layer 22B is made of a lithium metal, and can be manufactured as the first secondary battery. Therefore, with reference to FIGS. 1 and 2, corresponding components are assigned with the same reference symbols and descriptions for the same sections will be omitted.

That is, in the secondary battery, a lithium metal is used as an anode active material, and thereby a high energy density can be obtained. The anode active material layer 22B can exist already upon assembly, or it is possible that the anode active material layer 22B does not exist upon assembly but is made of a lithium metal precipitated upon charging. Further, it is possible that the anode active material layer 22B is utilized as an current collector and the anode current collector 22A is omitted.

In the secondary battery, when charged, for example, lithium ions are extracted from the cathode 21, and precipitated on the surface of the anode current collector 22A as a lithium metal through the electrolytic solution. When discharged, for example, the lithium metal is eluted from the anode active material layer 22B as lithium ions, which are inserted into the cathode 21 through the electrolytic solution. As above, in the secondary battery, precipitation and dissolution of the lithium metal are repeated in the anode 22. Therefore, activity of the anode 22 is very high. However, in this embodiment, since chemical stability of the electrolytic solution is high, cycle characteristics are improved.

(Fourth Secondary Battery)

In a fourth secondary battery, the capacity of the anode includes a capacity component by insertion and extraction of lithium as the electrode reactant and a capacity component by precipitation and dissolution of lithium, and the capacity of the anode is expressed by the sum thereof. The secondary battery has a structure as in the first secondary battery, except that the structure of the anode active material layer 22B is different, and can be manufactured as in the first secondary battery. Therefore, with reference to FIGS. 1 and 2, corresponding components are assigned with the same reference symbols and descriptions for the same sections will be omitted.

The anode active material layer 22B contains one or more anode materials capable of inserting and extracting lithium as an anode active material. If necessary, the anode active material layer 22B may contain a binder. As such an anode material, for example, the carbon material described in the first secondary battery, or a material containing a metal element or a metalloid element capable of forming an alloy with lithium as an element can be cited. Specially, the carbon material is preferably used, since superior cycle characteristics can be obtained.

The amount of the anode material capable of inserting and extracting lithium is adjusted so that the charge capacity by the anode material is smaller than the charge capacity of the cathode 21. Thereby, in the secondary battery, in the process of charge, a lithium metal begins to precipitate on the anode 22 when the open circuit voltage (that is, battery voltage) is lower than the overcharge voltage.

The overcharge voltage means the open circuit voltage when the battery becomes in the state of overcharge. For example, the overcharge voltage means a higher voltage than the open circuit voltage of the battery, which is "fully charged," described in and defined by "Guideline for safety assessment of lithium secondary batteries" (SBA G1101), which is one of the guidelines specified by Japan Storage Battery Industries Incorporated (Battery Association of Japan). In other words, the overcharge voltage indicates a higher voltage than the open circuit voltage after charge by using charging method used in determining nominal capacities of each battery, standard charging method, or recommended charging method. For example, in the case that charge is fully made when the open circuit voltage is 4.2 V, the lithium metal is precipitated on the surface of the anode material capable of inserting and extracting lithium in part of the range from 0 V to 4.2 V of the open circuit voltage. Therefore, in the secondary battery, both the anode material capable of inserting and extracting lithium and the lithium metal function as an anode active material, and the anode material capable of inserting and extracting lithium becomes a base material when the lithium metal is precipitated.

The secondary battery is similar to the traditional lithium ion secondary battery in view of using the anode material capable of inserting and extracting lithium for the anode 22. Further, the secondary battery is similar to the traditional lithium metal secondary battery in view of that the lithium metal is precipitated on the anode 22. However, in the secondary battery, by precipitating the lithium metal on the anode material capable of inserting and extracting lithium, a high energy density can be obtained, and cycle characteristics and rapid charge characteristics can be improved.

In the secondary battery, when charged, lithium ions are extracted from the cathode 21, and inserted into the anode material capable of inserting and extracting lithium contained in the anode 22 through the electrolytic solution. When further charged, in the state that the open circuit voltage is lower than the overcharge voltage, the lithium metal begins to be precipitated on the surface of the anode material capable of inserting and extracting lithium. After that, until charge is completed, the lithium metal continues to be precipitated on the anode 22. Next, when discharged, first, the lithium metal precipitated on the anode 22 is eluted as ions, which are inserted in the cathode 21 through the electrolytic solution. When further discharged, lithium ions are extracted from the anode material capable of inserting and extracting lithium in the anode 22, and inserted in the cathode 21 through the electrolytic solution. As above, in the secondary battery, precipitation and dissolution of the lithium metal are also repeated in the anode 22, and therefore activity of the anode 22 is very high. However, since chemical stability of the electrolytic solution is high in this embodiment, cycle characteristics are improved.

(Fifth Secondary Battery)

Figure 3:
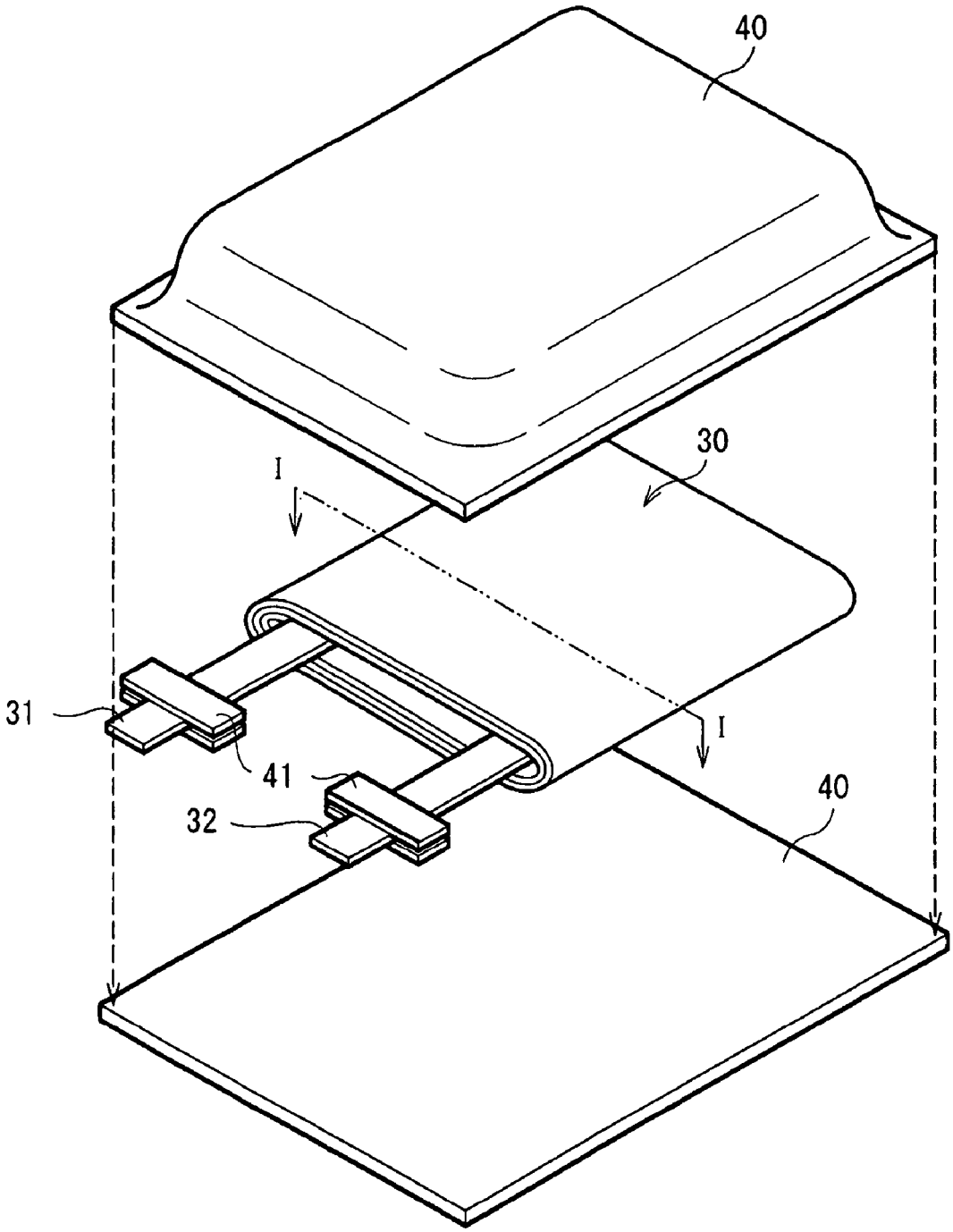
FIG. 3 is an exploded perspective view showing a structure of a fifth secondary battery using the electrolytic solution according to the embodiment of the present invention.

FIG. 3 shows a structure of a fifth secondary battery. The secondary battery is a so-called laminated film type secondary battery. In the secondary battery, a spirally wound electrode body 30 on which a cathode lead 31 and an anode lead 32 are attached is accommodated inside a film package member 40.

The cathode lead 31 and the anode lead 32 are directed from inside to outside of the package member 40, and, for example, are derived in the same direction, respectively. The cathode lead 31 and the anode lead 32 are respectively made of, for example, a metal material such as aluminum, copper, nickel and stainless, and respectively have a shape of thin plate or mesh.

The package member 40 is made of a rectangular aluminum laminated film in which, for example, a nylon film, an aluminum foil, and a polyethylene film are bonded together in this order. The package member 40 is, for example, arranged so that the polyethylene film side and the spirally wound electrode body 30 are faced, and the respective outer edges are contacted to each other by fusion bonding or an adhesive. Adhesive films 41 to protect from outside air intrusion are inserted between the package member 40 and the cathode lead 31, the anode lead 32. The adhesive film 41 is made of a material having contact characteristics to the cathode lead 31 and the anode lead 32 such as a polyolefin resin of polyethylene, polypropylene, modified polyethylene, modified polypropylene or the like.

The package member 40 may be made of a laminated film having other structure, a high molecular weight film such as polypropylene, or a metal film, instead of the foregoing aluminum laminated film.

Figure 4:
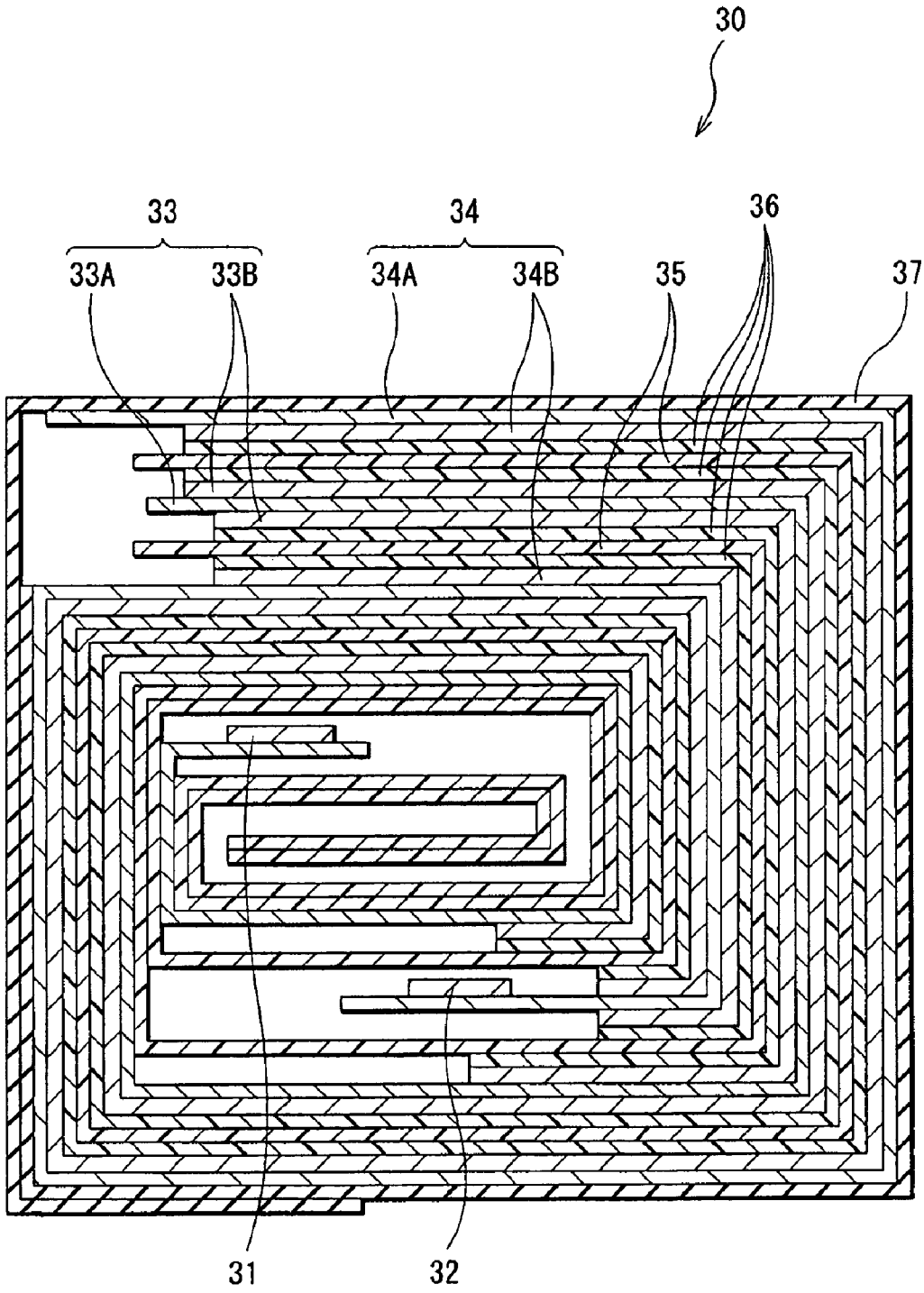
FIG. 4 is a cross section showing a structure taken along line I-I of a spirally wound electrode body shown in FIG. 3.

FIG. 4 shows a cross sectional structure taken along line I-I of the spirally wound electrode body 30 shown in FIG. 3. In the spirally wound electrode body 30, a cathode 33 and an anode 34 are layered with a separator 35 and an electrolyte layer 36 inbetween and wound. The outermost periphery thereof is protected by a protective tape 37.

The cathode 33 has a structure in which a cathode active material layer 33B is provided on a single face or both faces of a cathode current collector 33A. The anode 34 has a structure in which an anode active material layer 34B is provided on the single face or both faces of the anode current collector 34A. Arrangement is made so that the anode active material layer 34B is face to the cathode active material layer 33B. Structures of the cathode current collector 33A, the cathode active material layer 33B, the anode current collector 34A, the anode active material layer 34B, and the separator 35 are similar to of the cathode current collector 21A, the cathode active material layer 21B, the anode current collector 22A, the anode active material layer 22B, and the separator 23 in the first to the third secondary batteries described above.

The electrolyte layer 36 is in a so-called gelatinous state, containing the electrolytic solution according to this embodiment and a high molecular weight compound to become a holding body, which holds the electrolytic solution. The gelatinous electrolyte is preferable, since a high ion conductivity can be obtained, and leak of the battery can be prevented. As a high molecular weight material, for example, an ether high molecular weight compound such as polyethylene oxide and a cross-linked compound containing polyethylene oxide, an ester high molecular weight compound such as poly methacrylate or an acrylate high molecular weight compound, or a polymer of vinylidene fluoride such as polyvinylidene fluoride and a copolymer of vinylidene fluoride and hexafluoro propylene can be cited. One or more thereof are used by mixing. In particular, in view of redox stability, a fluorinated high molecular weight compound such as the polymer of vinylidene fluoride is desirable.

The secondary battery can be manufactured, for example, as follows.

First, the cathode 33 and the anode 34 are respectively coated with a precursor solution containing an electrolytic solution, a high molecular weight compound, and a mixed solvent. The mixed solvent is volatilized to form the electrolyte layer 36. After that, the cathode lead 31 is welded to the end of the cathode current collector 33A, and the anode lead 32 is welded to the end of the anode current collector 34A. Next, the cathode 33 and the anode 34 formed with the electrolyte layer 36 are layered with the separator 35 inbetween to obtain a lamination. After that, the lamination is wound in the longitudinal direction, the protective tape 37 is adhered to the outermost periphery thereof to form the spirally wound electrode body 30. Lastly, for example, the spirally wound electrode body 30 is sandwiched between the package members 40, and outer edges of the package members 40 are contacted by thermal fusion-bonding or the like to enclose the spirally wound electrode body 30. At this time, the adhesive films 41 are inserted between the cathode lead 31, the anode lead 32, and the package member 40. Thereby, the secondary battery shown in FIG. 3 and FIG. 4 is completed.

Further, the secondary battery may be fabricated as follows. First, as described above, the cathode 33 and the anode 34 are formed, and the cathode lead 31 and the anode lead 32 are attached on the cathode 33 and the anode 34, respectively.

After that, the cathode 33 and the anode 34 are layered with the separator 35 inbetween and wound. The protective tape 37 is adhered to the outermost periphery thereof, and a winding body as the precursor of the spirally wound electrode body 30 is formed. Next, the winding body is sandwiched between the package members 40, the outermost peripheries except for one side are thermal fusion-bonded to obtain a pouched state, and the winding body is accommodated inside the package member 40. Subsequently, a composition of matter for electrolyte containing an electrolytic solution, a monomer as the raw material for the high molecular weight compound, a polymerization initiator, and if necessary other material such as a polymerization inhibitor is prepared, which is injected into the package member 40.

After the composition of matter for electrolyte is injected, the opening of the package member 40 is thermal fusion-bonded and hermetically sealed in the vacuum atmosphere. Next, the resultant is heated to polymerize the monomer to obtain a high molecular weight compound. Thereby, the gelatinous electrolyte layer 36 is formed, and the secondary battery shown in FIG. 3 and FIG. 4 is assembled.

The secondary battery works similarly to the first to the fourth secondary batteries described above.

As above, according to this embodiment, the electrolytic solution contains 4-fluoro-1,3-dioxolane-2-one, and the fluorine ion content is in the range from 14 weight ppm to 1290 weight ppm. Therefore, in the second to the fifth secondary batteries, as in the first secondary battery, chemical stability of the electrolytic solution can be improved, and battery characteristics such as cycle characteristics can be improved.

EXAMPLES

Further, specific examples of the present invention will be described in detail.

Examples 1-1 to 1-6

The cylindrical secondary battery as shown in FIG. 1 was fabricated.

First, 0.5 mol of lithium carbonate and 1 mol of cobalt carbonate were mixed. The mixture was fired for 5 hours at 890 deg C. in the air to synthesize lithium cobalt complex oxide ($LiCoO_2$) as the cathode active material, which was then made into powders with the average particle diameter of 10 μm. Regarding the obtained lithium cobalt complex oxide, X-ray diffraction measurement was performed. The result thereof well corresponded with the spectrum of lithium cobalt complex oxide ($LiCoO_2$) registered in JCPDS file.

Next, 95 parts by weight of the lithium cobalt complex oxide powders and 5 parts by weight of lithium carbonate powders were mixed. 91 parts by weight of the mixture, 6 parts by weight of graphite (KS-15 of Lonza) as the electrical conductor, and 3 parts by weight of polyvinylidene fluoride as the binder were mixed to prepare a cathode mixture. The cathode mixture was dispersed in N-methyl-2-pyrrolidone as the solvent to form a cathode mixture slurry. Subsequently, both faces of the cathode current collector 21A made of an aluminum foil being 20 μm thick were coated with the cathode mixture slurry, which was then dried. The resultant was compression-molded to form the cathode active material layer 21B, and thereby the strip-shaped cathode 21 was formed.

Meanwhile, 10 g of copper powders and 90 g of tin powders were mixed. The mixture was put into the quartz boat, which was heated to 1000 deg C. in the argon atmosphere and then cooled down to room temperatures. The weight thereby obtained was pulverized in the ball mill in the argon atmosphere to obtain copper-tin alloy powders (10Cu-90Sn). The numerals shown before the chemical symbols are weight ratios. Next, by using the copper-tin alloy powders as an anode active material, 80 parts by weight of the copper-tin alloy powders, 11 parts by weight of graphite (KS-15 of Lonza) and 1 part by weight of acetylene black, which were the electrical conductor and the anode active material, and 8 parts by weight of polyvinylidene fluoride as the binder were mixed to prepare an anode mixture. The anode mixture was dispersed in N-methyl-2-pyrrolidone as the solvent to form an anode mixture slurry. Next, both faces of the anode current collector 22A made of a copper foil being 10 μm thick were coated with the anode mixture slurry, which was then dried. The resultant was compression-molded to form the anode active material layer 22B. Thereby, the strip-shaped anode 22 was formed.

The cathode 21 and the anode 22 respectively formed as above were wound several times with the separator 23 made of a micro porous polyethylene film being 25 μm thick (E25MMS of Tonen Chemical Corporation) in between after layering the anode 22, the separator 23, the cathode 21, and the separator 23 in this order. Thereby, the spirally wound electrode body 20 being 18 mm in outer diameter was formed. Further, the spirally wound electrode body 20 was fixed by an unshown adhesive tape.

The spirally wound electrode body 20 was accommodated in the battery can 11 made of nickel-plated iron. Then, on the top and bottom faces of the spirally wound electrode body 20, the insulating plates 12 and 13 were arranged. The cathode lead 25 made of aluminum was derived from the cathode current collector 21A and welded to the battery cover 14. Meanwhile, the anode lead 26 made of nickel was derived from the anode current collector 22A and welded to the battery can 11.

Next, 40 wt % of 4-fluoro-1,3-dioxolane-2-one (FEC), 45 wt % of dimethyl carbonate (DMC), and 15 wt % of $LiPF_6$ as the electrolyte salt were mixed to prepare an electrolytic solution. At this time, 4-fluoro-1,3-dioxolane-2-one was refined, and the fluorine ion content included in 4-fluoro-1,3-dioxolane-2-one was changed in Examples 1-1 to 1-6 as shown in Table 1. Fluorine ions are generated by dissociation of hydrogen fluoride contained in 4-fluoro-1,3-dioxolane-2-one. Therefore, by obtaining the proton content by neutralizing titration method, the content of fluorine ions was obtained.

Subsequently, the electrolytic solution was injected in the battery can 11. After that, by caulking the battery can 11 through the gasket 17 with the surface coated with asphalt, the safety valve mechanism 15, the PTC device 16, and the battery cover 14 were fixed and airtightness in the battery was maintained. Thereby, the cylindrical secondary battery being 18 mm in diameter and 65 mm high was fabricated.

As Comparative examples 1-1 to 1-4 relative to Examples 1-1 to 1-6, secondary batteries were fabricated as in Examples 1-1 to 1-6, except that the fluorine ion content contained in 4-fluoro-1,3-dioxolane-2-one was changed by refinement as shown in Table 1. Further, as Comparative example 1-5, a secondary battery was fabricated as in Examples 1-1 to 1-6, except that ethylene carbonate was used instead of 4-fluoro-1,3-dioxolane-2-one (FEC).

Regarding the fabricated secondary batteries of Examples 1-1 to 1-6 and Comparative examples 1-1 to 1-5, cycle characteristics were evaluated as follows. Further, after two cycles of charge and discharge were performed, each secondary battery was disassembled, and the fluorine ion content in the electrolytic solution was analyzed. The fluorine ion content in the electrolytic solution was also obtained by analyzing the proton content by using neutralizing titration method as described above. The results are shown in Table 1 and FIGS. 5 and 6.

(Low Load Cycle Characteristics)

After constant current and constant voltage charge at a current value of 1000 mA and at the upper limit voltage of 4.2 V was performed in the environment of 25 deg C., 100 cycles of charge and discharge that constant current discharge at a current value of 1000 mA was performed to the final voltage of 2.5 V were performed. Then, the capacity retention ratio (%) at the 100th cycle where the discharge capacity at the first cycle was 100 was obtained.

(High Load Cycle Characteristics)

Charge and discharge were performed as in the low load cycle characteristics, except that the current value in the constant current and constant voltage charge and constant current discharge was 3000 mA. Then, the capacity retention ratio (%) at the 100th cycle where the discharge capacity at the first cycle was 100 was obtained.

TABLE 1

| | Anode active material | Cathode active material | FEC (wt %) | $F^-$ Content in FEC (weight ppm) | $F^-$ Content in electrolytic solution (weight ppm) | Capacity retention ratio (%) Low load | High load |
|---|---|---|---|---|---|---|---|
| Example 1-1 | 10Cu—90Sn | $LiCoO_2$ | 40 | 3200 | 1290 | 35 | 30 |
| Example 1-2 | | | | 1400 | 570 | 37 | 35 |
| Example 1-3 | | | | 500 | 210 | 42 | 41 |
| Example 1-4 | | | | 100 | 50 | 46 | 45 |
| Example 1-5 | | | | 50 | 30 | 47 | 42 |
| Example 1-6 | | | | 10 | 14 | 49 | 38 |
| Comparative example 1-1 | 10Cu—90Sn | $LiCoO_2$ | 40 | 30000 | 12010 | 1 | — |
| Comparative example 1-2 | | | | 10000 | 4010 | 15 | 3 |
| Comparative example 1-3 | | | | 6900 | 2770 | 25 | 17 |
| Comparative example 1-4 | | | | 1 | 10 | 50 | 19 |
| Comparative example 1-5 | | | — | — | 10 | 1 | — |

Figure 5:
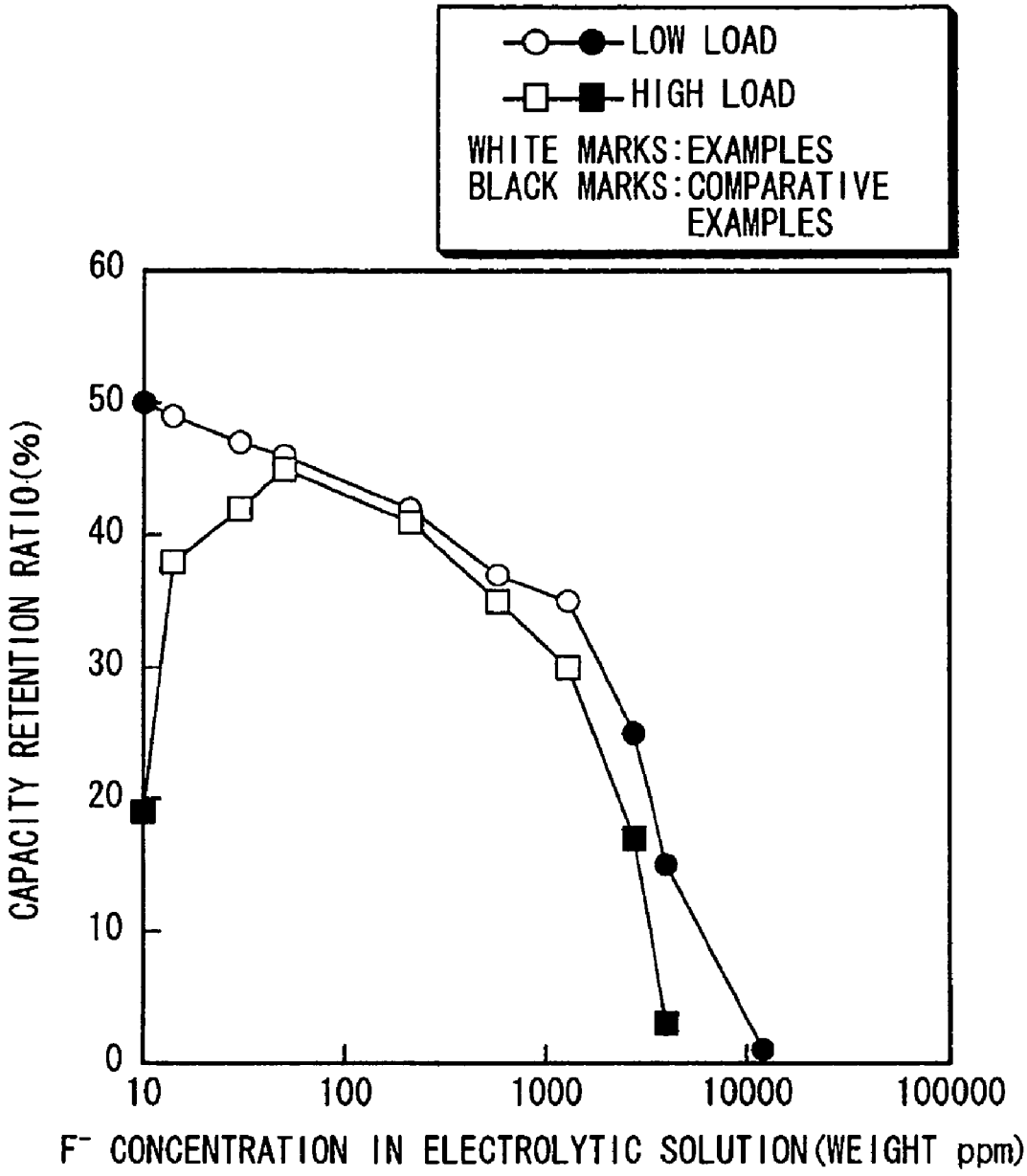
FIG. 5 is a characteristics view showing a relation between fluorine ion content in electrolytic solutions and capacity retention ratio.
Figure 6:
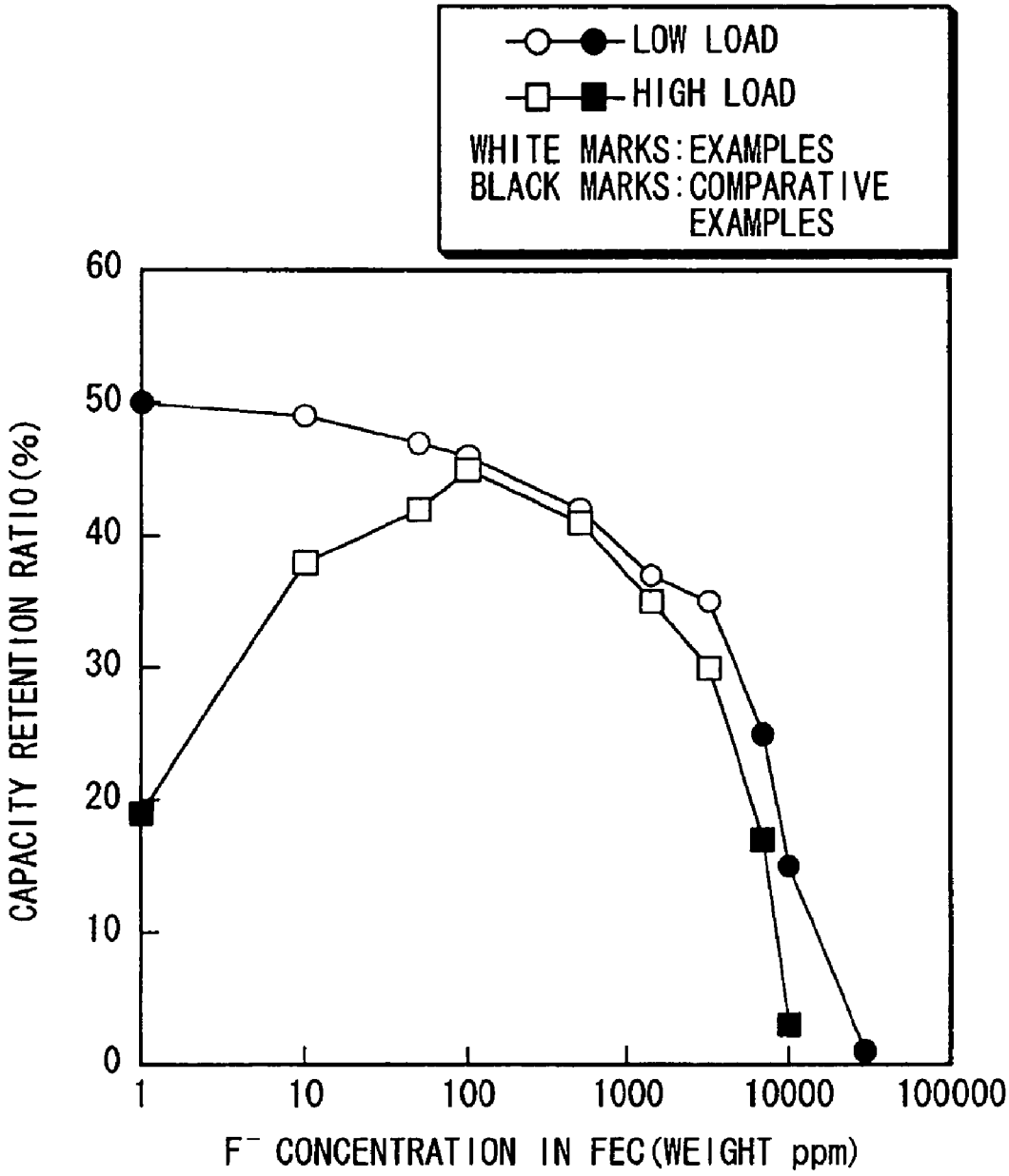
FIG. 6 is a characteristics view showing a relation between fluorine ion content in 4-fluoro-1,3-dioxolane-2-one and capacity retention ratio.

As shown in Table 1 and FIGS. 5 and 6, in the case of low load cycle, there was a tendency that when the fluorine ion content was decreased, the capacity retention ratio was improved. Meanwhile, in the case of high load cycle, there was a tendency that when the fluorine ion content was decreased, the capacity retention ratio was improved and then decreased. Further, in Comparative example 1-5 not using 4-fluoro-1,3-dioxolane-2-one (FEC), only the very low capacity retention ratio could be obtained.

That is, it was found that when 4-fluoro-1,3-dioxolane-2-one was used for the electrolytic solution and the fluorine ion content in the electrolytic solution was from 14 weight ppm to 1290 weight ppm, further from 14 weight ppm to 570 weight ppm, cycle characteristics could be improved. Further, it was found that when the fluorine ion content in 4-fluoro-1,3-dioxolane-2-one was from 10 weight ppm to 3200 weight ppm, further from 10 weight ppm to 1400 weight ppm, cycle characteristics could be improved.

Further, it was found that when the fluorine ion content in the electrolytic solution was 30 weight ppm or more, further 50 weight ppm or more, or the fluorine ion content in 4-fluoro-1,3-dioxolane-2-one was 50 weight ppm or more, further 100 weight ppm or more, superior cycle characteristics could be obtained and refinement steps of 4-fluoro-1,3-dioxolane-2-one could be simplified.

Examples 2-1 to 2-6

Secondary batteries were fabricated as in Examples 1-1 to 1-6, except that CoSnC containing material powders were used instead of copper-tin alloy powders as an anode active material. Then, the CoSnC containing material powders were formed as follows. First, as raw materials, cobalt powders, tin powders, carbon powders were prepared. Cobalt powders and tin powders were alloyed to form cobalt-tin alloy powders, to which carbon powders were added and dry-blended. Next, the mixture and 400 g of a steel ball being 9 mm in diameter were set in the reaction vessel of a planetary ball mill of Ito Seisakusho. Subsequently, inside of the reaction vessel was substituted with the argon atmosphere. Then, 10-minute operation at 250 rpm and 10-minute interval were repeated until the total operation time reached 30 hours to synthesize a CoSnC containing material by utilizing mechanochemical reaction. After that, the reaction vessel was cooled down to room temperatures and the synthesized CoSnC containing material powders were taken out. Coarse grains were removed through a sieve having 280 meshes.

Figure 7:
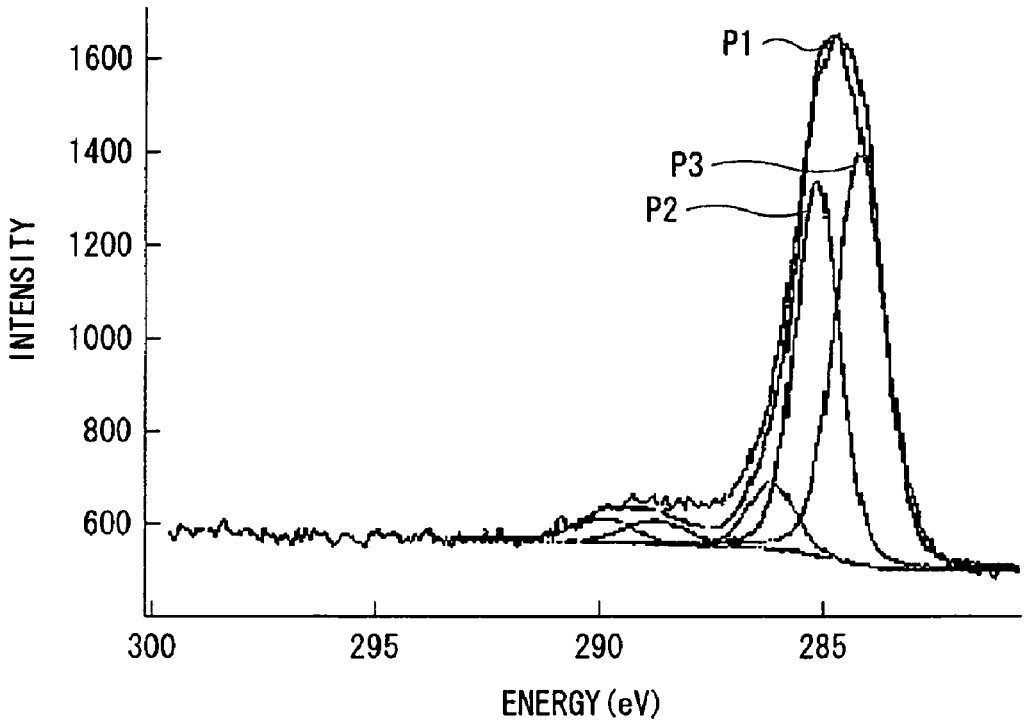
FIG. 7 is an example showing peaks obtained by X-ray photoelectron spectroscopy according to a CoSnC containing material formed in Examples.

Regarding the obtained CoSnC containing material, the composition was analyzed. The carbon content was measured by a carbon sulfur analyzer. The cobalt content and tin content were measured by ICP (Inductively Coupled Plasma) optical emission spectroscopy. In the result, the cobalt content was 33.0 wt %, the tin content was 56.1 wt %, and the carbon content was 9.9 wt %. Further, regarding the obtained CoSnC containing material, X-ray diffraction was performed. In the result, the diffraction peak having a wide half value width with the diffraction angle 2θ of 1.0 degree or more was observed in the range of diffraction angle 2θ=20 to 50 degrees. Further, when XPS was performed for the CoSnC containing material, as shown in FIG. 7, a peak P1 was obtained. When the peak P1 was analyzed, a peak P2 of surface contamination carbon and a peak P3 of C1s in the CoSnC containing material on the energy side lower than of the peak P2 were obtained. The peak P3 was obtained in the region lower than 284.5 eV. That is, it was confirmed that carbon in the CoSnC containing material was bonded with other element.

The fluorine ion content in 4-fluoro-1,3-dioxolane-2-one used for the electrolytic solution was changed in Examples 2-1 to 2-6 as shown in Table 2 like in Examples 1-1 to 1-6.

Further, as Comparative examples 2-1 and 2-2 relative to Examples 2-1 to 2-6, secondary batteries were fabricated as in Examples 2-1 to 2-6, except that the fluorine ion content contained in 4-fluoro-1,3-dioxolane-2-one was changed as shown in Table 2.

Regarding the fabricated secondary batteries of Examples 2-1 to 2-6 and Comparative examples 2-1 and 2-2, cycle characteristics were evaluated, and the fluorine ion content in the electrolytic solution were examined as in Examples 1-1 to 1-6. The results are shown in Table 2 and FIGS. 8 and 9. In Table 2 and FIGS. 8 and 9, as the initial discharge capacity, the discharge capacity at the first cycle in obtaining the low load cycle characteristics is shown.

TABLE 2

| | Anode active material | | | | | | | | Concentration of $F^-$ in | Capacity | | Initial |
|---|---|---|---|---|---|---|---|---|---|---|---|---|
| | Composition (wt %) | | | Co/Sn + Co | Cathode active | FEC | Concentration of $F^-$ in FEC | electrolytic solution | retention ratio (%) | | discharge capacity |
| | Co | Sn | C | (wt %) | material | (wt %) | (weight ppm) | (weight ppm) | Low load | High load | (mAh) |
| Example 2-1 | 33 | 56.1 | 9.9 | 37 | $LiCoO_2$ | 40 | 3200 | 1290 | 93 | 91 | 2850 |
| Example 2-2 | | | | | | | 1400 | 570 | 94 | 92 | 2850 |
| Example 2-3 | | | | | | | 500 | 210 | 95 | 94 | 2850 |
| Example 2-4 | | | | | | | 100 | 50 | 97 | 96 | 2850 |
| Example 2-5 | | | | | | | 50 | 30 | 95 | 92 | 2850 |
| Example 2-6 | | | | | | | 10 | 14 | 94 | 90 | 2850 |
| Comparative example 2-1 | 33 | 56.1 | 9.9 | 37 | $LiCoO_2$ | 40 | 6900 | 2770 | 92 | 84 | 2790 |
| Comparative example 2-2 | | | | | | | 1 | 10 | 93 | 85 | 2850 |

Figure 8:
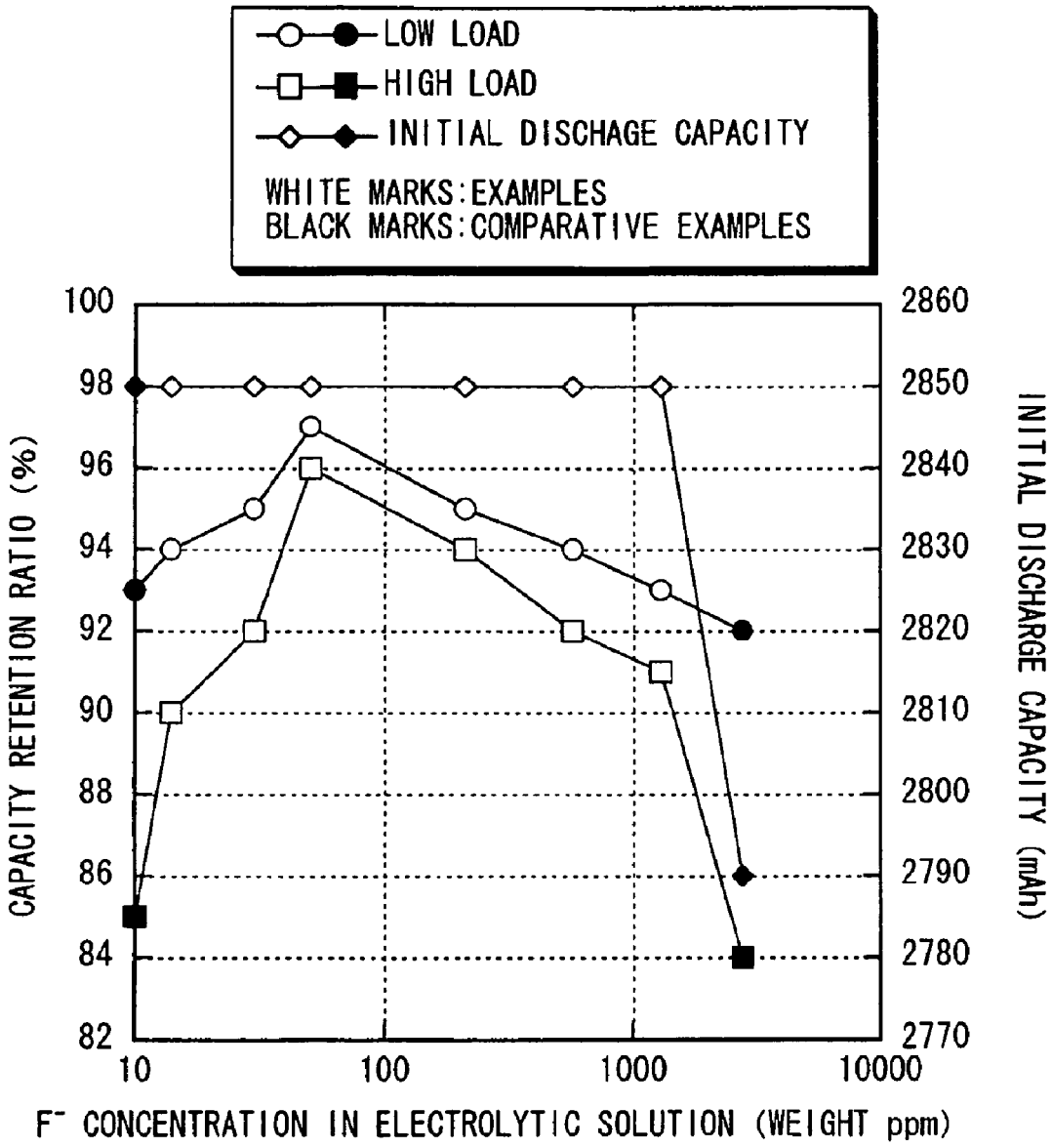
FIG. 8 is a characteristics view showing a relation of fluorine ion content in electrolytic solutions, capacity retention ratio, and initial discharge capacity.
Figure 9:
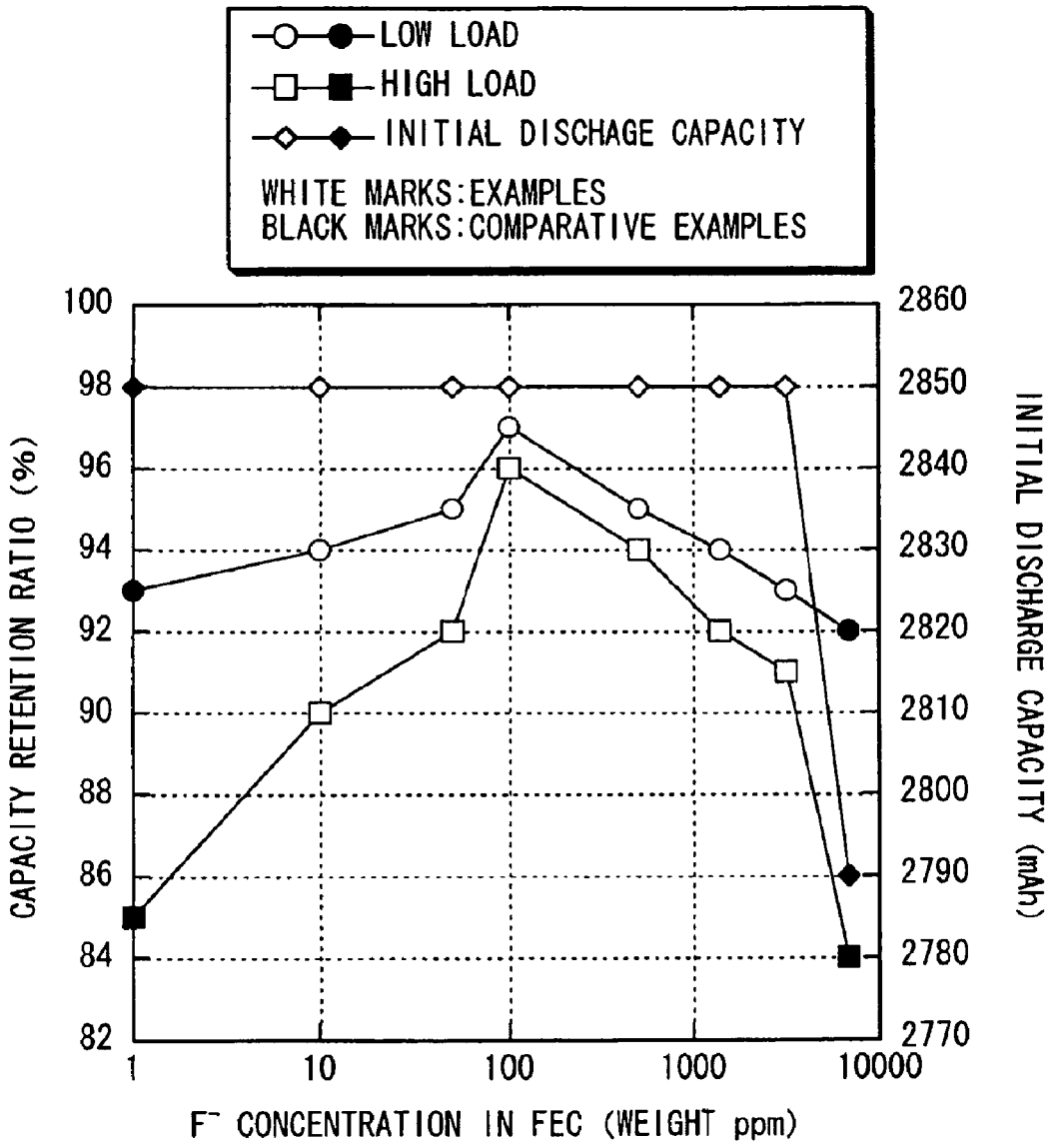
FIG. 9 is a characteristics view showing a relation of fluorine ion content in 4-fluoro-1,3-dioxolane-2-one, capacity retention ratio, and initial discharge capacity.

As shown in Table 2 and FIGS. 7 and 8, in both low load and high load, there was a tendency that when the fluorine ion content was decreased, cycle characteristics were improved and then decreased. Further, there was a tendency that when the fluorine ion content was decreased, the initial discharge capacity was improved and then maintained at a constant level.

That is, it was found that also in the case of using the CoSnC containing material as an anode active material, when 4-fluoro-1,3-dioxolane-2-one was used for the electrolytic solution and the fluorine ion content in the electrolytic solution was from 14 weight ppm to 1290 weight ppm, further from 14 weight ppm to 570 weight ppm, cycle characteristics could be improved. Further, it was found that when the fluorine ion content in the electrolytic solution was 30 weight ppm or more, further 50 weight ppm or more, superior cycle characteristics could be obtained and refinement steps of 4-fluoro-1,3-dioxolane-2-one could be simplified.

Further, as evidenced by comparing Table 1 to Table 2, compared to Examples 1-1 to 1-6 using the copper-tin alloy as an anode active material, Examples 2-1 to 2-6 using the CoSnC containing material provided higher capacity retention ratio. That is, it was found that when the CoSnC containing material was used, superior cycle characteristics could be obtained.

Examples 3-1 to 3-10

A CoSnC containing material or CoSn alloy were formed as in Example 2-2, except that the composition of the anode active material was changed. Then, in Examples 3-1 to 3-5, the carbon content was about 9.9 wt %, and the ratio of cobalt to the total of tin and cobalt (hereinafter referred to as Co/(Sn+Co) ratio) was changed. In Example 3-6, the Co/(Sn+Co) ratio was 37 wt %, and carbon was not added. In Examples 3-7 to 3-10, the Co/(Sn+Co) ratio was 37 wt %, and the carbon content was changed.

Regarding the obtained CoSnC containing material or CoSn alloy, the composition was analyzed as in Example 2-2. The result is shown in Tables 3 and 4. Further, regarding the obtained CoSnC containing material, X-ray diffraction was performed. In the result, the diffraction peak having a wide half value width with the diffraction angle 2θ of 1.0 degree or more was observed in the range of diffraction angle 2θ=20 to 50 degrees. Further, when XPS was performed for the CoSnC containing material, as in Example 2-2, the peak P3 of C1s in the CoSnC containing material was obtained in the region lower than 284.5 eV. That is, it was confirmed that carbon in the CoSnC containing material was bonded with other element.

Next, by using the obtained CoSnC containing material or CoSn alloy, as in Example 2-2, secondary batteries were fabricated. Regarding the fabricated secondary batteries of Examples 3-1 to 3-10, cycle characteristics and the initial discharge capacity were examined, and the fluorine ion content in the electrolytic solution was examined as in Example 2-2. The results are shown in Tables 3 and 4.

TABLE 3

| | Anode active material | | | | | | | Concentration of $F^-$ in | Capacity | Initial |
|---|---|---|---|---|---|---|---|---|---|---|
| | Composition (wt %) | | | Co/Sn + Co | Cathode active | FEC | Concentration of $F^-$ in FEC | electrolytic solution | retention ratio (low load) | discharge capacity |
| | Co | Sn | C | (wt %) | material | (wt %) | (weight ppm) | (weight ppm) | (%) | (mAh) |
| Example 3-1 | 66.8 | 22.3 | 9.9 | 75 | $LiCoO_2$ | 40 | 1400 | 570 | 95 | 1660 |
| Example 3-2 | 62.4 | 26.7 | | 70 | | | | | 96 | 2250 |
| Example 3-3 | 53.5 | 35.6 | | 60 | | | | | 95 | 2350 |
| Example 2-2 | 33 | 56.1 | | 37 | | | | | 94 | 2850 |
| Example 3-4 | 26.7 | 62.4 | | 30 | | | | | 92 | 2940 |
| Example 3-5 | 17.8 | 71.3 | | 20 | | | | | 50 | 3100 |

TABLE 4

| | Anode active material | | | | | | | Concentration of $F^-$ in | Capacity | Initial |
|---|---|---|---|---|---|---|---|---|---|---|
| | Composition (wt %) | | | Co/Sn + Co | Cathode active | FEC | Concentration of $F^-$ in FEC | electrolytic solution | retention ratio (low load) | discharge capacity |
| | Co | Sn | C | (wt %) | material | (wt %) | (weight ppm) | (weight ppm) | (%) | (mAh) |
| Example 3-6 | 36.6 | 62.4 | 0 | 37 | $LiCoO_2$ | 40 | 1400 | 570 | 35 | 2030 |
| Example 2-2 | 33 | 56.1 | 9.9 | | | | | | 94 | 2850 |
| Example 3-7 | 31.1 | 53 | 14.9 | | | | | | 97 | 3060 |
| Example 3-8 | 29.3 | 49.9 | 19.8 | | | | | | 94 | 3270 |
| Example 3-9 | 25.6 | 43.7 | 29.7 | | | | | | 90 | 2990 |
| Example 3-10 | 22 | 37.4 | 39.6 | | | | | | 40 | 2170 |

As shown in Table 3, there was a tendency that when the Co/(Sn+Co) ratio was increased, the capacity retention ratio was improved and the initial discharge capacity was decreased. Further, as shown in Table 4, there was a tendency that when the carbon content was increased, both the capacity retention ratio and the initial discharge capacity were improved, showed the maximum value, and then decreased. That is, it was found that when the carbon content was from 9.9 wt % to 29.7 wt %, and the CoSnC containing material with the Co/(Sn+Co) ratio from 30 wt % to 70 wt % was used, high energy density could be obtained and superior cycle characteristics could be obtained.

Examples 4-1 and 4-2

Secondary batteries were fabricated as in Examples 2-1 to 2-6, except that the composition of the CoSnC containing material was changed. Then, in Example 4-1, the CoSnC containing material was formed as in Examples 2-1 to 2-6, except that as raw materials, cobalt powders, tin powders, carbon powders, and silicon powders were prepared, and cobalt powders and tin powders were alloyed to form cobalt tin alloy powders, to which carbon powders and silicon powders were added and mixed. In Example 4-2, the CoSnC containing material was formed as in Examples 2-1 to 2-6, except that as raw materials, cobalt powders, tin powders, carbon powders, and titanium powders were prepared, and cobalt powders, tin powders, and titanium powders were alloyed to form cobalt•tin•titanium alloy powders, to which carbon powders were added and mixed.

Regarding the obtained CoSnC containing material, the composition was analyzed as in Examples 2-1 to 2-6. The results are shown in Tables 5 and 6. Further, regarding the obtained CoSnC containing material, X-ray diffraction was performed. In the result, the diffraction peak having a wide half value width with the diffraction angle 2θ of 1.0 degree or more was observed in the range of diffraction angle 2θ=20 to 50 degrees. Further, when XPS was performed for the CoSnC containing material, as in Examples 2-1 to 2-6, the peak P3 of C1s in the CoSnC containing material was obtained in the region lower than 284.5 eV. That is, it was confirmed that carbon in the CoSnC containing material was bonded with other element.

Further, regarding the fabricated secondary batteries of Examples 4-1 and 4-2, as in Examples 2-1 to 2-6, cycle characteristics and the initial discharge capacity were evaluated, and the fluorine ion content in the electrolytic solution was examined. The results are shown in Tables 5 and 6 together with the results of Example 3-8.

TABLE 5

| | Anode active material | | | | | | | | Concentration of $F^-$ in | Capacity retention | Initial |
|---|---|---|---|---|---|---|---|---|---|---|---|
| | Composition (wt %) | | | | Co/Sn + Co | Cathode active | FEC | Concentration of $F^-$ in FEC | electrolytic solution | ratio (low load) | discharge capacity |
| | Co | Sn | C | Si | (wt %) | material | (wt %) | (weight ppm) | (weight ppm) | (%) | (mAh) |
| Example 4-1 | 27.8 | 47.4 | 19.8 | 4 | 37 | $LiCoO_2$ | 40 | 1400 | 570 | 90 | 3400 |
| Example 3-8 | 29.3 | 49.9 | 19.8 | — | | | | | | 94 | 3270 |

TABLE 6

| | Anode active material | | | | | | | | Concentration of $F^-$ in | Capacity retention | Initial |
|---|---|---|---|---|---|---|---|---|---|---|---|
| | Composition (wt %) | | | | Co/Sn + Co | Cathode active | FEC | Concentration of $F^-$ in FEC | electrolytic solution | ratio (low load) | discharge capacity |
| | Co | Sn | C | Ti | (wt %) | material | (wt %) | (weight ppm) | (weight ppm) | (%) | (mAh) |
| Example 4-2 | 26.3 | 48.9 | 19.8 | 4 | 35 | $LiCoO_2$ | 40 | 1400 | 570 | 96 | 3350 |
| Example 3-8 | 29.3 | 49.9 | 19.8 | — | 37 | | | | | 94 | 3270 |

As shown in Tables 5 and 6, it was found that when silicon was contained, the initial discharge capacity could be improved though the capacity retention ratio was decreased, and it was found that when titanium was contained, the capacity retention ratio could be improved. That is, it was found that when other element such as silicon and titanium was contained according to needs, the capacity or cycle characteristics could be more improved.

Examples 5-1 to 5-6

Secondary batteries were fabricated as in Examples 1-1 to 1-6, except that cobalt-indium-titanium-silicon alloy powders (16Co-21n-2Ti-80Si) were used instead of copper-tin alloy powders as an anode active material. The numerals shown before the chemical symbols represent weight ratios. Then, cobalt-indium-titanium-silicon alloy powders were obtained as follows. 80 g of silicon powders, 16 g of cobalt powders, 2 g of indium powders, and 2 g of titanium powders were mixed. The mixture was put in the quartz boat, heated to 1000 deg C. in the argon gas atmosphere, cooled down to room temperatures and pulverized. Thereby, the cobalt-indium-titanium-silicon alloy powders were obtained.

The fluorine ion content contained in 4-fluoro-1,3-dioxolane-2-one used for the electrolytic solution was changed in Examples 5-1 to 5-6 as shown in Table 7 as in Examples 1-1 to 1-6.

Further, as Comparative examples 5-1 and 5-2 relative to Examples 5-1 to 5-6, secondary batteries were fabricated as in Examples 5-1 to 5-6, except that the fluorine ion content contained in 4-fluoro-1,3-dioxolane-2-one was changed as shown in Table 7.

Regarding the fabricated secondary batteries of Examples 5-1 to 5-6 and Comparative examples 5-1 and 5-2, cycle characteristics were evaluated, and the fluorine ion content in the electrolytic solution was examined as in Examples 1-1 to 1-6. The results are shown in Table 7 and FIGS. 10 and 11.

Figure 10:
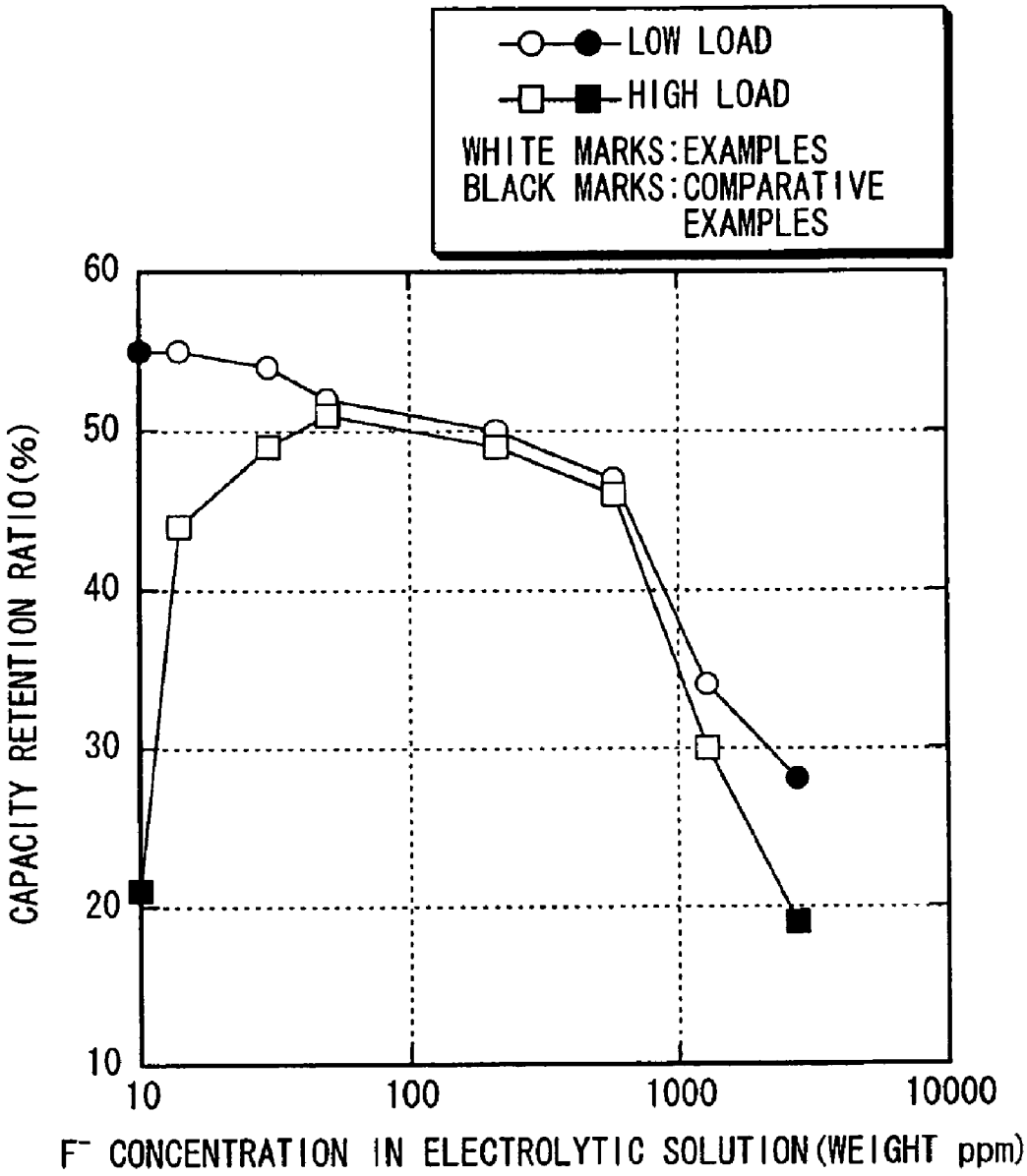
FIG. 10 is a characteristics view showing a relation between fluorine ion content in electrolytic solutions and capacity retention ratio.
Figure 11:
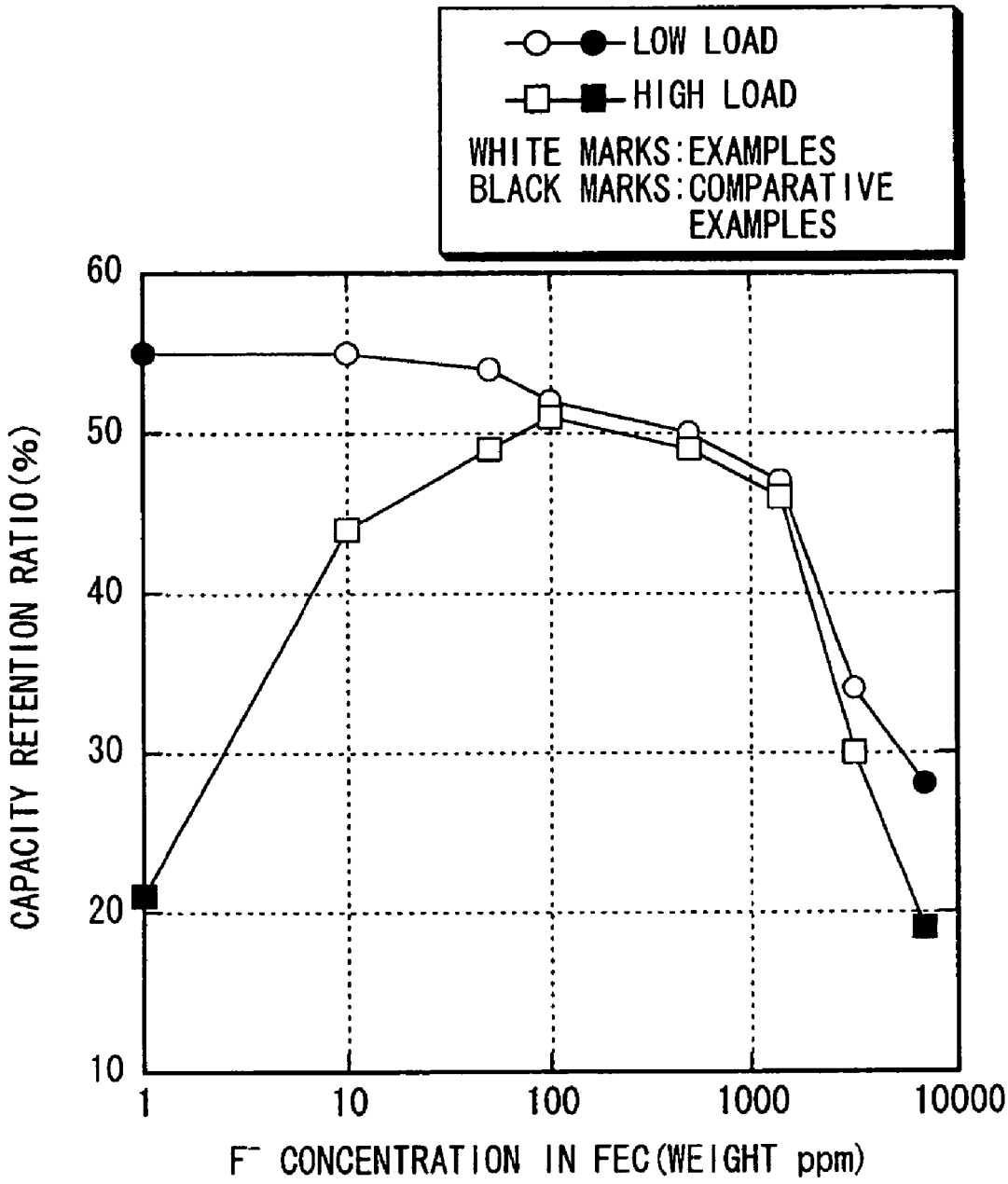
FIG. 11 is a characteristics view showing a relation between fluorine ion content in 4-fluoro-1,3-dioxolane-2-one and capacity retention ratio.

As shown in Table 7 and FIGS. 10 and 11, in the case of low load cycle, there was a tendency that when the fluorine ion content was decreased, the capacity retention ratio was improved. Meanwhile, in the case of high load cycle, there was a tendency that when the fluorine ion content was decreased, the capacity retention ratio was improved and then decreased 0.0125

That is, it was found that also in the case using the anode material containing silicon as an element as an anode active material, when 4-fluoro-1,3-dioxolane-2-one was used for the electrolytic solution and the fluorine ion content in the electrolytic solution was from 14 weight ppm to 1290 weight ppm, further from 14 weight ppm to 570 weight ppm, cycle characteristics could be improved. Further, it was found that when the fluorine ion content in the electrolytic solution was 30 weight ppm or more, further 50 weight ppm or more, superior cycle characteristics could be obtained, and refinement steps of 4-fluoro-1,3-dioxolane-2-one could be simplified.

Example 6

A secondary battery was fabricated as in Examples 1-1 to 1-6, except that graphite (KS44 of Lonza) was used instead of copper-tin alloy powders as an anode active material. The fluorine ion content contained in 4-fluoro-1,3-dioxolane-2-one used for the electrolytic solution was 1400 weight ppm. Further, as Comparative example 6 relative to Example 6, a secondary battery was fabricated as in Example 6, except that the fluorine ion content contained in 4-fluoro-1,3-dioxolane-2-one was 30000 weight ppm.

Regarding the fabricated secondary batteries of Example 6 and Comparative example 6, cycle characteristics were evaluated, and the fluorine ion content in the electrolytic solution was examined as in Examples 1-1 to 1-6. The results are shown in Table 8.

TABLE 7

| | Anode active material | Cathode active material | FEC (wt %) | Concentration of $F^-$ in FEC (weight ppm) | Concentration of $F^-$ in electrolytic solution (weight ppm) | Capacity retention ratio (%) | |
|---|---|---|---|---|---|---|---|
| | | | | | | Low load | High load |
| Example 5-1 | 16Co—2In—2Ti—80Si | $LiCoO_2$ | 40 | 3200 | 1290 | 34 | 30 |
| Example 5-2 | | | | 1400 | 570 | 47 | 46 |
| Example 5-3 | | | | 500 | 210 | 50 | 49 |
| Example 5-4 | | | | 100 | 50 | 52 | 51 |
| Example 5-5 | | | | 50 | 30 | 54 | 49 |
| Example 5-6 | | | | 10 | 14 | 55 | 44 |
| Comparative example 5-1 | 16Co—2In—2Ti—80Si | $LiCoO_2$ | 40 | 6900 | 2770 | 28 | 19 |
| Comparative example 5-2 | | | | 1 | 10 | 55 | 21 |

TABLE 8

| | Anode active material | Cathode active material | FEC (wt %) | $F^-$ Content in FEC (weight ppm) | $F^-$ Content in electrolytic solution (weight ppm) | Capacity retention ratio (low load) (%) |
|---|---|---|---|---|---|---|
| Example 6 | Graphite | $LiCoO_2$ | 40 | 1400 | 570 | 65 |
| Comparative example 6 | Graphite | $LiCoO_2$ | 40 | 30000 | 12010 | 8 |

As shown in Table 8, as in Examples 1-1 to 1-6, when the fluorine ion content was decreased, the capacity retention ratio could be improved. That is, it was found that also in the case using the carbon material as an anode active material, by controlling the fluorine ion content, cycle characteristics could be improved.

Examples 7-1, 7-2, 8-1, and 8-2

Secondary batteries were fabricated as in Example 1-2 or 2-2, except that lithium nickel cobalt complex oxide ($LiNi_{0.8}Co_{0.2}O_2$) or lithium nickel manganese cobalt complex oxide ($LiNi_{0.4}Mn_{0.3}Co_{0.3}O_2$) was used instead of the lithium cobalt complex oxide as a cathode active material. Then, in Example 7-1, $LiNi_{0.8}Co_{0.2}O_2$ was used for the cathode active material, and 10Cu-90Sn alloy was used for the anode active material. In Example 7-2, $LiNi_{0.4}Mn_{0.3}Co_{0.3}O_2$ was used for the cathode active material, and 10Cu-90Sn alloy was used for the anode active material. In Example 8-1, $LiNi_{0.8}Co_{0.2}O_2$ was used for the cathode active material, and CoSnC containing material powders (Co: 33 wt %, Sn: 56.1 wt %, C: 9.9 wt %) were used for the anode active material. In Example 8-2, $LiNi_{0.4}Mn_{0.3}Co_{0.3}O_2$ was used for the cathode active material, and CoSnC containing material powders (Co: 33 wt %, Sn: 56.1 wt %, C: 9.9 wt %) were used for the anode active material.

Regarding the fabricated secondary batteries of Examples 7-1, 7-2, 8-1, and 8-2, cycle characteristics were evaluated, and the fluorine ion content in the electrolytic solution was examined as in Examples 1-2 and 2-2. The results are shown in Tables 9 and 10 together with the results of Examples 1-2 and 2-2.

As shown in Tables 9 and 10, the capacity retention ratio could be more improved in Examples 7-1, 7-2, 8-1, and 8-2 using the complex oxide containing lithium and nickel as a cathode active material than in Examples 2-1 and 2-2 using the complex oxide not containing nickel. That is, it was found that when the complex oxide containing lithium and nickel was used, cycle characteristics could be more improved.

Examples 9-1 to 9-4

Secondary batteries were fabricated as in Example 2-2, except that CoSnC containing material powders were used as an anode active material, and the composition of the electrolytic solution was changed. Then, the electrolytic solution was adjusted by adding acetonitrile to the mixture of 40 wt % of 4-fluoro-1,3-dioxolane-2-one, 45 wt % of dimethyl carbonate, and 15 wt % of $LiPF_6$ as the electrolyte salt. The acetonitrile content in the electrolytic solution was 0.1 wt % in Example 9-1, 0.5 wt % in Example 9-2, 2 wt % in Example 9-3, and 3 wt % in Example 9-4. The fluorine ion content contained in 4-fluoro-1,3-dioxolane-2-one was 1400 weight ppm for the respective examples.

Regarding the fabricated secondary batteries of Examples 2-2, and 9-1 to 9-4, high temperature cycle characteristics and high temperature storage characteristics were evaluated as follows. Further, the fluorine ion content in the electrolytic solution was analyzed as in Example 2-2. The results are shown in Table 11.

(High Temperature Cycle Characteristics)

After constant current and constant voltage charge at a current value of 1000 mA and at the upper limit voltage of 4.2 V was performed in the environment of 45 deg C., 100 cycles of charge and discharge that constant current discharge at a current value of 1000 mA was performed to the final voltage of 2.5 V were performed. Then, the capacity retention ratio (%) at the 100th cycle where the discharge capacity at the first cycle was 100 was obtained.

TABLE 9

| | Anode active material | Cathode active material | FEC (wt %) | $F^-$ Content in FEC (weight ppm) | $F^-$ Content in electrolytic solution (weight ppm) | Capacity retention ratio (low load) (%) |
|---|---|---|---|---|---|---|
| Example 7-1 | 10Cu—90Sn | $LiNi_{0.8}Co_{0.2}O_2$ | 40 | 1400 | 570 | 45 |
| Example 7-2 | | $LiNi_{0.4}Mn_{0.3}Co_{0.3}O_2$ | | | | 40 |
| Example 1-2 | | $LiCoO_2$ | | | | 37 |

TABLE 10

| | Composition of anode active material (wt %) | | | Cathode active | FEC | $F^-$ Content in FEC | $F^-$ Content in electrolytic solution | Capacity retention ratio (low load) |
|---|---|---|---|---|---|---|---|---|
| | Co | Sn | C | material | (wt %) | (weight ppm) | (weight ppm) | (%) |
| Example 8-1 | 33 | 56.1 | 9.9 | $LiNi_{0.8}Co_{0.2}O_2$ | 40 | 1400 | 570 | 96 |
| Example 8-2 | | | | $LiNi_{0.4}Mn_{0.3}Co_{0.3}O_2$ | | | | 97 |
| Example 2-2 | | | | $LiCoO_2$ | | | | 94 |

(High Temperature Storage Characteristics)

After constant current and constant voltage charge at a current value of 1000 mA and at the upper limit voltage of 4.2 V was performed in the environment of 23 deg C., constant current discharge at a current value of 1000 mA was performed to the final voltage of 2.5 V to obtain the discharge capacity before storage. Next, the battery was stored for one month in the constant temperature bath at 60 deg C. After that, charge and discharge were again performed under the same conditions as of the discharge capacity before storage, the discharge capacity after storage was obtained, and the capacity retention ratio (%) after storage where the discharge capacity before storage was 100 was obtained.

TABLE 11

| | Composition of anode active material (wt %) | | | Electrolytic solution | | High temperature cycle characteristics | High temperature storage characteristics |
|---|---|---|---|---|---|---|---|
| | Co | Sn | C | F (weight ppm) | Acetonitrile (wt %) | (%) | (%) |
| Example 2-2 | 33 | 56.1 | 9.9 | 570 | 0 | 83 | 90 |
| Example 9-1 | | | | | 0.1 | 87 | 95 |
| Example 9-2 | | | | | 0.5 | 89 | 95 |
| Example 9-3 | | | | | 2 | 89 | 94 |
| Example 9-4 | | | | | 3 | 87 | 92 |

As shown in Table 11, according to Examples 9-1 to 9-4, in which acetonitrile was added, high temperature cycle characteristics and high temperature storage characteristics could be more improved than in Example 2-2. Further, there was a tendency that when the acetonitrile content was increased, high temperature cycle characteristics and high temperature storage characteristics were improved, and then decreased. That is, it was found that when nitrile was contained in the electrolytic solution, high temperature cycle characteristics and high temperature storage characteristics could be improved, and the content thereof was preferably from 0.1 wt % to 3 wt %, and more preferably from 0.1 wt % to 2 wt %.

The present invention has been described with reference to the embodiment and the examples. However, the present invention is not limited to the embodiment and the examples, and various modifications may be made. For example, in the foregoing embodiment and examples, descriptions have been given of the case using the electrolytic solution as an electrolyte, and further, in the foregoing embodiment, descriptions have been given of the case using the gelatinous electrolyte, in which the electrolytic solution is held in the high molecular weight compound. However, other electrolyte may be used. As other electrolyte, for example, a mixture of an ion conductive inorganic compound such as ion conductive ceramics, ion conductive glass, and ionic crystal and an electrolytic solution; a mixture of other inorganic compound and an electrolytic solution; or a mixture of the foregoing inorganic compound and a gelatinous electrolyte can be cited.

Further, in the foregoing embodiment and examples, descriptions have been given of the battery using lithium as an electrode reactant. However, the present invention can be also applied to the case using other alkali metal such as sodium (Na) and potassium (K); an alkali earth metal such as magnesium and calcium (Ca); or other light metal such as aluminum. Then, for the anode, the anode active material described in the foregoing embodiment, for example, the material containing tin or silicon as an element, or the carbon material can be similarly used.

Further, in the foregoing embodiment and examples, descriptions have been given with reference to the cylindrical secondary battery or the laminated film type secondary battery. However, the present invention can be similarly applied to a secondary battery having other shape such as a coin-type battery, a button-type battery, and a square-type battery, or a secondary battery having other structure such as a laminated structure. Further, the present invention can be applied not only to the secondary battery, but also to other battery such as a primary battery.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A solution comprising an electrolytic solution comprising 4-fluoro-1,3-dioxolane-2-one and fluorine ions, wherein the fluorine ion content in the electrolytic solution ranges from about 14 weight ppm to about 1290 weight ppm.

2. A solution according to claim 1, wherein the 4-fluoro-1,3-dioxolane-2-one comprises fluorine ions as an impurity, the impurity ranges from about 10 weight ppm to about 3200 weight ppm.

3. A solution according to claim 1 further containing nitrile.

4. A battery comprising:

a cathode;

an anode; and an electrolytic solution, wherein the electrolytic solution contains 4-fluoro-1,3-dioxolane-2-one and fluorine ions, wherein the fluorine ion content in the electrolytic solution that ranges from about 14 weight ppm to about 1290 weight ppm.

5. A battery according to claim 4, wherein the 4-fluoro-1,3-dioxolane-2-one comprises fluorine ions as an impurity, the impurity ranges from about 10 weight ppm to about 3200 weight ppm.

6. A battery according to claim 4, wherein the electrolytic solution further contains nitrile.

7. A battery according to claim 4, wherein the anode contains an anode material containing at least one of tin and silicon.

8. A battery according to claim 7, wherein the anode material further contains at least one of nickel, copper, iron, cobalt, manganese, zinc, indium, silver, titanium, germanium, bismuth, antimony, and chromium.

9. A battery according to claim 7 wherein the anode material contains tin, cobalt, and carbon, in which a carbon content of the anode material is from about 9.9 wt % to about 29.7 wt %, and a ratio of cobalt to a sum of tin and cobalt is from about 30 wt % to about 70 wt %.

10. A battery according to claim 9, wherein the anode material obtains a 1s peak of carbon in a region lower than 284.5 eV by X-ray photoelectron spectroscopy.

11. A battery according to claim 4, wherein the cathode contains a complex oxide containing lithium and nickel.

12. A solution according to claim 1, wherein the fluorine ion content in the electrolytic solution ranges from about 30 weight ppm to about 1290 weight ppm.

13. A solution according to claim 1, wherein the fluorine ion content in the electrolytic solution ranges from about 30 weight ppm to about 570 weight ppm.

14. A battery according to claim 4, wherein the fluorine ion content in the electrolytic solution ranges from about 30 weight ppm to about 1290 weight ppm.

15. A battery according to claim 4, wherein the fluorine ion content in the electrolytic solution ranges from about 30 weight ppm to about 570 weight ppm.

16. A solution according to claim 1, further containing nitrile in an amount of between about 0.1 wt % and 3.0 wt %.

17. A solution according to claim 1, further containing nitrile in an amount of between about 0.1 wt % and 2.0 wt %.

18. A battery according to claim 4, wherein the electrolytic solution further contains nitrile in an amount of between about 0.1 wt % and 3.0 wt %.

19. A battery according to claim 4, wherein the electrolytic solution further contains nitrile in an amount of between about 0.1 wt % and 2.0 wt %.

*20. A battery according to claim 4, further containing a lithium salt wherein the lithium salt is at least one selected from the group consisting of* $LiPF_6$, $LiBF_4$, $LiClO_4$, $LiAsF_6$, $LiN(CF_3SO_2)_2$, $LiN(C_2F_5SO_2)_3$ $LiB(C_6H_5)_4$, $LiB(C_2O_4)_2$, $LiCF_3SO_3$, *LiCl, and LiBr.*

*21. A method of manufacturing a solution, the method comprising:*

*forming an electrolytic solution including 4-fluoro-1,3-dioxolane-2-one and fluorine ions, wherein the fluorine ion content in the electrolytic solution ranges from about 14 weight ppm to about 1290 weight ppm.*

*22. The method of manufacturing a solution according to claim 21, wherein the 4-fluoro-1,3-dioxolane-2-one comprises fluorine ions as an impurity, and the impurity ranges from about 10 weight ppm to about 3200 weight ppm.*

*23. The method of manufacturing a solution according to claim 21, wherein the fluorine ion content in the electrolytic solution ranges from about 30 weight ppm to about 1290 weight ppm.*

*24. The method of manufacturing a solution according to claim 21, wherein the fluorine ion content in the electrolytic solution ranges from about 30 weight ppm to about 570 weight ppm.*

*25. The method of manufacturing a solution according to claim 21, wherein the electrolytic solution further contains nitrile in an amount of between about 0.1 wt % and 3.0 wt %.*

*26. The method of manufacturing a solution according to claim 21, wherein the electrolytic solution further contains nitrile in an amount of between about 0.1 wt % and 2.0 wt %.*

*27. The method of manufacturing a solution according to claim 21, wherein preparing the electrolytic solution further includes mixing in at least one lithium salt selected from the group consisting of* $LiPF_6$, $LiBF_4$, $LiClO_4$, $LiAsF_6$, $LiN(CF_3SO_2)_2$, $LiN(C_2F_5SO_2)_2$, $LiC(CF_3SO_2)_3$, $LiB(C_6H_5)_4$, $LiB(C_2O_4)_2$, $LiCF_3SO_3$, $LiCH_3SO_3$, *LiCl, and LiBr.*

*28. A method of manufacturing a battery, the method comprising:*

*forming a solution comprising an electrolytic solution including 4-fluoro-1,3-dioxolane-2-one and fluorine ions, wherein the fluorine ion content in the electrolytic solution ranges from about 14 weight ppm to about 1290 weight ppm.*

*29. The method of manufacturing a battery according to claim 28, further comprising impregnating the electrolytic solution into a separator of the battery.*

*30. The method of manufacturing a battery according to claim 28, the method further comprising:*

*forming a cathode by preparing a cathode mixture, dispersing the cathode mixture in a solvent to produce a cathode mixture slurry, coating faces of a cathode current collector with the cathode mixture slurry, and drying the cathode current collector to thereby form the cathode; and*

*forming an anode by preparing an anode mixture, dispersing the anode mixture in a solvent to produce an anode mixture slurry, coating faces of an anode current collector with the anode mixture slurry, and drying the anode current collector to thereby form the anode.*

*31. The method of manufacturing a battery according to claim 30, the method further comprising winding the cathode and the anode a plurality of times along with a separator.*

*32. The method of manufacturing a battery according to claim 31, the method further comprising inserting the wound anode, cathode and separator in a housing.*

*33. The method of manufacturing a battery according to claim 32, the method further comprising injecting the electrolytic solution into the housing.*

*34. The method of manufacturing a battery according to claim 28, wherein the 4-fluoro-1,3-dioxolane-2-one comprises fluorine ions as an impurity, and the impurity ranges from about 10 weight ppm to about 3200 weight ppm.*

*35. The method of manufacturing a battery according to claim 28, wherein the fluorine ion content in the electrolytic solution ranges from about 30 weight ppm to about 1290 weight ppm.*

*36. The method of manufacturing a battery according to claim 28, wherein the fluorine ion content in the electrolytic solution ranges from about 30 weight ppm to about 570 weight ppm.*

*37. The method of manufacturing a battery according to claim 28, wherein the electrolytic solution further contains nitrile in an amount of between about 0.1 wt % and 3.0 wt %.*

*38. The method of manufacturing a battery according to claim 28, wherein the electrolytic solution further contains nitrile in an amount of between about 0.1 wt % and 2.0 wt %.*

*39. The method of manufacturing a battery according to claim 28, wherein preparing the electrolytic solution further includes mixing in at least one lithium salt selected from the group consisting of* $LiPF_6$, $LiBF_4$, $LiClO_4$, $LiAsF_6$, $LiN(CF_3SO_2)_2$, $LiN(C_2F_5SO_2)_2$, $LiC(CF_3SO_2)_3$, $LiB(C_6H_5)_4$, $LiB(C_2O_4)_2$, $LiCF_3SO_3$, $LiCH_3SO_3$, *LiCl, and LiBr.*

* * * * *